US012749717B2

(12) United States Patent
Peng et al.

(10) Patent No.: US 12,749,717 B2
(45) **Date of Patent: *Sep. 29, 2026**

(54) ELECTRODE ASSEMBLY AND MANUFACTURING METHOD THEREFOR, BATTERY CELL, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Shuangjuan Peng, Ningde (CN); Haihe Xiao, Ningde (CN); Xiaowen Zhang, Ningde (CN); Baiqing Li, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 557 days.

This patent is subject to a terminal disclaimer.

(21) Appl. No.: 18/341,089

(22) Filed: Jun. 26, 2023

(65) Prior Publication Data

US 2023/0361354 A1 Nov. 9, 2023

Related U.S. Application Data

(63) Continuation of application No. PCT/CN2021/132426, filed on Nov. 23, 2021.

(51) Int. Cl.

| | |
|---|---|
| ***H01M 10/0583*** | (2010.01) |
| ***H01M 10/0525*** | (2010.01) |
| ***H01M 50/466*** | (2021.01) |

(52) U.S. Cl.

CPC ... *H01M 10/0583* (2013.01); *H01M 10/0525* (2013.01); *H01M 50/466* (2021.01); *H01M 2220/20* (2013.01)

(58) Field of Classification Search

CPC ......... H01M 10/0431; H01M 10/0459; H01M 10/052; H01M 10/0525; H01M 10/0583;

(Continued)

(56) References Cited

U.S. PATENT DOCUMENTS

| | | | |
|---|---|---|---|
| 5,635,312 A | 6/1997 | Yanagisawa et al. | |
| 2017/0149092 A1 * | 5/2017 | Zhu | H01M 10/0431 |

FOREIGN PATENT DOCUMENTS

| | | |
|---|---|---|
| CN | 1776939 A | 5/2006 |
| CN | 1992391 A | 7/2007 |

(Continued)

OTHER PUBLICATIONS

Machine translation CN105633451A (Year: 2016).*

(Continued)

*Primary Examiner* — Victoria H Lynch

(74) *Attorney, Agent, or Firm* — Ladas & Parry, LLP

(57) ABSTRACT

An electrode assembly and a manufacturing method therefor, a battery cell, a battery, and a power consuming device are described. The electrode assembly includes: a first electrode plate; a first separator; and a second separator. The second separator and the first separator are located on two opposite sides of the first electrode plate in a thickness direction, and the first separator and the second separator are both turned over and enclose an edge of the first electrode plate that is provided with no tab. On this basis, the safety performance of the battery can be effectively improved.

20 Claims, 17 Drawing Sheets

(58) Field of Classification Search
CPC ......... H01M 10/0587; H01M 2220/20; H01M 50/466; H01M 50/531; Y02E 60/10; Y02P 70/50
See application file for complete search history.

(56) References Cited

FOREIGN PATENT DOCUMENTS

| | | | |
|---|---|---|---|
| CN | 102326218 | A | 1/2012 |
| CN | 102664285 | A | 9/2012 |
| CN | 105633451 | A | 6/2016 |
| CN | 106532134 | A | 3/2017 |
| CN | 213340434 | U | 6/2021 |
| CN | 113571761 | A | 10/2021 |
| EP | 3381078 | B1 | 4/2020 |
| JP | H0613066 | A | 1/1994 |
| JP | 07147155 | A | 6/1995 |
| JP | H09017441 | A | 1/1997 |
| JP | 2015185359 | A | 10/2015 |
| JP | 2015185363 | A | 10/2015 |
| JP | 2019096466 | A | 6/2019 |
| WO | 20200179547 | A1 | 9/2020 |
| WO | 2021109363 | A1 | 6/2021 |

OTHER PUBLICATIONS

Machine translation JP2015185359A (Year: 2015).*
ISR for International Application PCT/CN2021/132426 mailed Aug. 23, 2022.
Written Opinion for International Application PCT/CN2021/132426 mailed Aug. 23, 2022.
Japanese office action dated Jul. 30, 2024 for application JP 2023-540064.
Extended European Search Report dated Feb. 5, 2024 for Application No. EP 21965020.7.
Notification to Grant Patent Right from corresponding Chinese Patent Application No. 202180089191 dated Jun. 8, 2026, with search report.

* cited by examiner

ELECTRODE ASSEMBLY AND MANUFACTURING METHOD THEREFOR, BATTERY CELL, BATTERY, AND POWER CONSUMING DEVICE

CROSS REFERENCE TO RELATED APPLICATIONS

This application is a continuation of Application No. PCT/CN2021/132426 filed Nov. 23, 2021, the entire contents of which are incorporated herein by reference.

TECHNICAL FIELD

The present application relates to the field of batteries, and in particular, to an electrode assembly and a manufacturing method therefor, a battery cell, a battery, and a power consuming device.

BACKGROUND ART

At present, with the increasingly extensive application, the batteries are not only applied to energy storage power systems such as water power, thermal power, wind power, and solar power plants, but also widely applied to electric transportation means such as electric bicycles, electric motorcycles, and electric cars, as well as military equipment and aerospace, etc.

In the development of battery technology, how to reduce the risk of short circuit of the battery and improve the safety of the battery is an important issue.

SUMMARY OF THE INVENTION

The present application provides an electrode assembly, a battery cell, a battery, a power consuming device, and a method for manufacturing an electrode assembly, in order to improve the safety of the battery.

To achieve the above objective, the present application provides an electrode assembly, comprising:

a first electrode plate;

a first separator; and a second separator, wherein the second separator and the first separator are located on two opposite sides of the first electrode plate in a thickness direction, and the first separator and the second separator are both turned over and enclose an edge of the first electrode plate that is provided with no tab.

Since the edge of the first electrode plate is provided with no tab is wrapped by two layers of separators, foreign matter is less likely to pierce the first electrode plate, the risk of short circuit is reduced, and the safety performance is improved.

In some embodiments, the first separator and the second separator are compounded on the first electrode plate. In this way, it is beneficial to improve the wrapping firmness.

In some embodiments, the first separator and the second separator are hot-pressed on the first electrode plate, or the first separator and the second separator are bonded on the first electrode plate. When the first separator and the second separator are compounded on the first electrode plate by hot pressing or bonding, the wrapping firmness can be effectively improved.

In some embodiments, the first electrode plate is a positive electrode plate. When the first electrode plate is the positive electrode plate, wrapping is more convenient and the safety performance is better.

In some embodiments, the first electrode plate is not folded; or the first electrode plate is folded once in a first direction such that the first electrode plate comprises two first stack sections connected to each other. When the first electrode plate is not folded, it is convenient to implement a winding forming method or an individual plate stacking method. When the first electrode plate is folded once, the first electrode plate can be folded to form a U-shaped structure, so that it is convenient for the first electrode plate to be assembled with other electrode plates after being folded, facilitating the improvement of the production efficiency of the stacked battery.

In some embodiments, at least one of the two first stack sections of the first electrode plate is provided with a tab. When only one of the two first stack sections of the first electrode plate is provided with a tab, the structure is simple. When the two first stack sections of the first electrode plate are both provided with tabs, the electric energy transmission efficiency is higher and the operating reliability is higher.

In some embodiments, the first electrode plate has an inert zone, the inert zone comprises the bent portion of the first electrode plate, and the inert zone is coated with no active material. On this basis, it is convenient to control the area of the part of the negative electrode plate extending beyond the positive electrode plate.

In some embodiments, the surface of the inert zone of the first electrode plate facing the second electrode plate is provided with an insulating material. In this way, it is beneficial to improve the insulation between the second electrode plate and the first electrode plate, and improve the safety performance.

In some embodiments, the electrode assembly further comprises a second electrode plate, the second electrode plate has an opposite polarity to the first electrode plate and is stacked or wound together with the first electrode plate, and the first separator and the second separator separate the second electrode plate from the first electrode plate. Here, the electrode assembly is a wound cell core or a stacked cell core.

In some embodiments, the second electrode plate is not folded, or the second electrode plate is repeatedly folded in a second direction such that the second electrode plate comprises a plurality of second stack sections connected and stacked in sequence. When the second electrode plate is not folded, it is convenient to implement a winding forming method or an individual plate stacking method. When the second electrode plate is repeatedly folded, the second electrode plate can form a continuous Z-shaped structure, so that it is convenient for the second electrode plate to be assembled with other electrode plates after being folded, facilitating the improvement of the production efficiency of the stacked battery.

In some embodiments, the second electrode plate is repeatedly folded in the second direction such that the second electrode plate comprises a plurality of second stack sections connected and stacked in sequence, and the first electrode plate is folded once in the second direction first direction such that the first electrode plate comprises two first stack sections connected to each other, the first direction being perpendicular or parallel to the second direction; and the first stack sections and the second stack sections are stacked alternately in sequence. On this basis, the time of a cutting process can be shortened, and the stacking efficiency can be improved, thereby effectively improving the production efficiency of the stacked battery.

In some embodiments, a tab of the second electrode plate is located at an edge of the second electrode plate except for a bent portion; and/or a tab of the first electrode plate is located at an edge of the first electrode plate except for a bent portion. When the tab of the second electrode plate and/or the first electrode plate are located at the edge except for the bent portion, the tab is less likely to be damaged due to the folding process, providing a high structural reliability.

In some embodiments, the first direction is perpendicular to the second direction, the tab of the second electrode plate is located at the edge of the second electrode plate adjacent to the bent portion, and the tab of the first electrode plate is located at the end of the first electrode plate away from the bent portion. On this basis, in an orthogonal "Z+U" stacking method used by the second electrode plate and the first electrode plate, the tabs protrude in the folding direction of the first electrode plate, facilitating the protruding of the tabs of the second electrode plate and the first electrode plate on the same side or on different sides in the first direction, and thus meeting the design requirements of the battery cell with positive and negative terminals arranged on the same side or on the different sides.

In some embodiments, the first direction is perpendicular to the second direction; and among any two adjacent second stack sections, only one second stack section is provided with a tab, and the bent portion of the first electrode plate encloses the second stack section that is provided with no tab. In this way, it is convenient to physically isolate the positive and negative tabs to prevent a short circuit between the positive and negative tabs.

In some embodiments, the first direction is parallel to the second direction, the tab of the second electrode plate is located at the edge of the second electrode plate adjacent to the bent portion, and the tab of the first electrode plate is located at the edge of the first electrode plate adjacent to the bent portion. On this basis, in an orthogonal "Z+U" stacking method used by the second electrode plate and the first electrode plate, the tabs protrude in a direction perpendicular to the folding direction of the first electrode plate, facilitating the protruding of the tabs of the second electrode plate and the first electrode plate on the same side or on the different sides in a longitudinal direction of the second electrode plate, and thus meeting the design requirements of the battery cell with positive and negative terminals arranged on the same side or on the different sides.

In some embodiments, the tab of the second electrode plate and the tab of the first electrode plate are located on the same side or on two opposite sides. When the tab of the second electrode plate and the tab of the first electrode plate are located on the same side, it is convenient to meet the design requirements of the battery cell with the positive and negative terminals arranged on the same side. When the tab of the second electrode plate and the tab of the first electrode plate are located on the two opposite sides, it is convenient to meet the design requirements of the battery cell with the negative terminals arranged on the two opposite sides.

In some embodiments, the first electrode plate and/or the second electrode plate are/is provided with a folding guide portion, for guiding the folding of the first electrode plate and/or the second electrode plate. Under the guidance of the folding guide portion, the first electrode plate and/or the second electrode plate can be folded more conveniently, facilitating the further improvement of the production efficiency of the stacked battery.

In some embodiments, the folding guide portion comprises an indentation or a crease. The indentation or crease provided herein can effectively provide a folding guidance function to facilitate folding.

In some embodiments, the folding guide portion is parallel to a width direction of the first electrode plate and/or the second electrode plate, or the folding guide portion is inclined relative to the width direction of the first electrode plate and/or the second electrode plate. When the folding guide portion is parallel to the width direction of the first electrode plate and/or the second electrode plate, the folding guide portion is convenient to machine. When the folding guide portion is inclined relative to the width direction of the first electrode plate and/or the second electrode plate, it is beneficial to reduce the risk of lithium precipitation and improve the safety performance.

The present application provides a battery cell, comprising a shell, and further comprising an electrode assembly of the embodiments of the present application, wherein the electrode assembly is arranged inside the shell. Since the production efficiency of the electrode assembly is improved, the production efficiency of the battery cell comprising the electrode assembly is improved.

In some embodiments, the tab of the first electrode plate is located at the end of the first electrode plate away from the bent portion, and the bent portion of the first electrode plate is in contact with an inner wall of the shell. In this way, the electrode assembly can be in contact with the shell to conduct heat, improving the heat dissipation performance of the battery cell.

In some embodiments, the surface of the bent portion of the first electrode plate facing away from the second electrode plate faces the direction of gravity. In this way, the first electrode plate can be conveniently in full contact with the inner wall of the shell under the action of gravity, so as to achieve a better heat dissipation effect.

The present application provides a battery, comprising a packaging box, and further comprising a battery cell according to the embodiments of the present application, wherein the battery cell is arranged in the packaging box. Since the production efficiency of the battery cell is improved, the production efficiency of the battery comprising the battery cell is improved.

The present application provides a power consuming device, comprising a body, and further comprising a battery cell or a battery according to the embodiments of the present application, wherein the battery cell supplies electric energy for the body. On this basis, the production efficiency of the power consuming device can be effectively improved.

The present application provides a method for manufacturing an electrode assembly, the method comprising:

- providing a first electrode plate; and
- providing a first separator and a second separator on two opposite sides of the first electrode plate in a thickness direction, and turning over both the first separator and the second separator to enclose an edge of the first electrode plate that is provided with no tab.

The electrode assembly manufactured by using the above method has a reduced risk of short circuit and an improved safety performance.

In some embodiments, the manufacturing method further comprises:

- folding the first electrode plate, which is enclosed by the first separator and the second separator that are turned over, once in a first direction such that the first electrode plate comprises two first stack sections connected to each other;
- providing a second electrode plate, and repeatedly folding the second electrode plate in a second direction such that the second electrode plate comprises a plurality of second stack sections connected and stacked in sequence, the second direction being perpendicular or parallel to the first direction; and inserting the first electrode plate into the second electrode plate such that the first stack sections and the second stack sections are stacked alternately in sequence.

Using the above method to manufacture the electrode assembly has a high efficiency and can effectively improve the production efficiency of the stacked battery.

By turning over both the first separator and the second separator located on the two opposite sides of the same first electrode plate in the thickness direction to enclose the edge of the first electrode plate that is provided with no tab, it is possible to reliably prevent the occurrence of short-circuit accidents caused by the foreign matter at the edge, thereby effectively improving the safety performance.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

The accompanying drawings described herein are intended to provide a further understanding of the present application, which constitutes a part of the present application. The schematically embodiments of the present application and the description thereof are intended to explain the present application, and do not constitute an undue limitation on the present application. In the drawings.

LIST OF REFERENCE SIGNS

Figure 1:
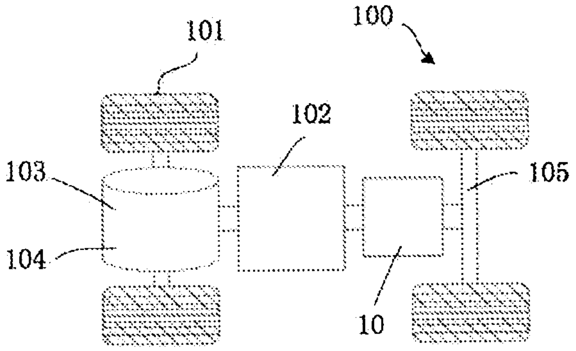
FIG. 1 is a schematic diagram of a power consuming device in an embodiment of the present application.

- 100. Power consuming device; 101. Vehicle; 102. Controller; 103. Power apparatus; 104. Motor; 105. Body;
- 10. battery;
- 20. Battery cell; 201. Electrode assembly; 202. Shell; 203. Shell body; 204. End cap; 205. Adapter; 206. Electrode terminal; 207. Sheath; 208. Insulator; 209. Pressing plate; **20*a*. Negative terminal; 20*b*. Positive terminal; 20*c***. Cell core;
- 30. Packaging box; 301. Box body; 302. Box cover;
- 2. First electrode plate; 21. First stack section; 22. First tab; 23. Positive tab; 24. Positive electrode plate; 25. Bent portion; 26. Inert zone; 27. Insulating material; 28. Folding guide portion; 281. Indentation; 282. Crease; 29. Active material;
- 1. Second electrode plate; 11. Second stack section; 12. Second tab; 13. Negative tab; 14. Negative electrode plate; 15. Tab;
- 3. Separator; 31. Flanging; 32. First separator; 33. Second separator;
- Y. First direction; X. Second direction; Z. Third direction.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

With the rapid development of electronic products and power consuming devices such as electric vehicles, the application of batteries is becoming more and more extensive, which are not only applied to energy storage power systems such as water power, thermal power, wind power, and solar power plants, but also widely applied to electric transportation means such as electric bicycles, electric motorcycles, and electric vehicles, as well as military equipment and aerospace, etc. With the continuous expansion of the application field of the traction batteries, there is also increasing requirements for the performance of the batteries.

Safety is an important performance index of the batteries. During the use and routine maintenance of the batteries, it is necessary to prevent safety accidents such as short circuit. However, during use, foreign matter on the electrode plate of the battery is likely to electrically connect the positive and negative electrode plates, causing a short circuit and bringing about safety accidents.

In view of the above situation, the present application provides an electrode assembly, a battery cell, a battery, a power consuming device, and a method for manufacturing an electrode assembly, in order to improve the safety of the battery.

FIGS. 1-39 show a power consuming device, a battery, a battery cell, and an electrode assembly and a manufacturing method therefor in some embodiments of the present application.

Next, the present application will be described with reference to FIGS. 1-39.

FIG. 1 illustratively shows the structure of a power consuming device 100.

Referring to FIG. 1, a power consuming device 100 is a device that uses a battery cell 20 as a power supply, and comprises the battery cell 20 and a body 105. The battery 10 is arranged on the body 105 and supplies electric energy for the body 105. Alternatively, the power consuming device 100 comprises a body 105 and a battery 10 comprising a battery cell 20. The battery 10 is arranged on the body 105, and the battery cell 20 of the battery 10 supplies electric energy for the body 105.

The power consuming device 100 may be a mobile phone, a tablet, a notebook computer, an electric toy, a power tool, a battery car, an electric vehicle, a ship, a spacecraft, etc. The electric toy may include a stationary or mobile electric toy, such as a game machine, an electric toy car, an electric toy ship, an electric toy airplane, etc. The spacecrafts may include airplanes, rockets, aerospace planes, spaceships, etc.

The power consuming device 100 comprises a power source comprising the battery 10, wherein the battery 10 provides a driving force to the power consuming device 100. In some embodiments, all of the driving force of the power consuming device 100 results from electric energy, in which case the power source comprises only the battery 10. In some other embodiments, the driving force of the power consuming device 100 comprises electric energy and other sources of energy (e.g., mechanical energy), in which case the power source comprises the battery 10 and other apparatuses such as an engine.

The case where the power consuming device 100 is a vehicle 101 is taken as an example. Referring to FIG. 1, in some embodiments, the power consuming device 100 is a new energy vehicle such as a battery electric vehicle, a hybrid vehicle, or an extended-range vehicle, and comprises the battery 10, a controller 102, and a power apparatus 103 such as a motor 104. The battery 10 is electrically connected to the power apparatus 103 such as the motor 104 by means of the controller 102, such that the battery 10 can supply power to the power apparatus 103 such as the motor 104 under the control of the controller 102.

It can be seen that the battery 10 and its battery cell 20 are important components of the power consuming device 100.

Figure 2:
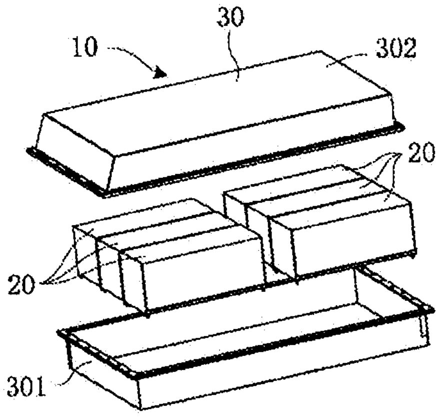
FIG. 2 is a schematic diagram of a battery in an embodiment of the present application.

FIG. 2 illustratively shows the structure of the battery 10.

Referring to FIG. 2, the battery 10 comprises a packaging box 30 and a battery cell 20 arranged in the packaging box 30. The packaging box 30 comprises a box body 301 and a box cover 302. The box body 301 and the box cover 302 are snap-fitted with each other, so that a closed receiving space is formed inside the packaging box 30 for receiving the battery cell 20. There may be at least two battery cells 20 in the packaging box 30, so as to supply more electric energy and meet higher electricity demand. The battery cells 20 in the battery 10 are in series connection, in parallel connection or in series-parallel connection to achieve a higher capacity or power. It should be noted that, in FIG. 2, a simplified drawing method is used for the battery cell 20.

It can be seen that the battery cell 20 is the smallest battery unit for supplying electric energy, and is the core component of the battery 10 and the power consuming device 100, and its performance directly affects the performance of the battery 10 and the power consuming device 100. At the same time, the production efficiency of the battery cell also directly affects the production efficiency of the power consuming device 100 and the battery 10. The improvement of the production efficiency and performance of the battery cell 20 is beneficial to the improvement of the production efficiency and performance of the power consuming device 100 and the battery 10.

The battery cell 20 may be various types of battery cells such as lithium ion batteries, and may have various shapes such as square or cylinder.

FIGS. 3-38 illustratively show the structure of the battery cell.

Referring to FIGS. 3-38, the battery cell 20 comprises a shell 202, a cell core 20*c*, adapters 205 and electrode terminals 206.

The shell 202 is configured to receive the components (such as the cell core 20*c* and the adapters 205) located inside the shell 202, so as to provide protection for the components located inside the shell 202. The shell 202 comprises a shell body 203 and an end cap 204. The end cap 204 covers an end opening of the shell body 203, so that a closed space for receiving the cell core 20*c* and other components is formed inside the shell 202.

The cell core 20*c* is configured to generate electric energy, is arranged inside the shell 202, and supplies electric energy by electrochemically reacting with an electrolyte injected into the shell 202. The cell core 20*c* comprises a first electrode plate 2, a second electrode plate 1 and separators 3, which are assembled together. The second electrode plate 1 and the first electrode plate 2 are electrode plates with opposite polarities. When one of the electrode plates is a negative electrode plate 14 (also called an anode electrode plate), the other is a positive electrode plate 24 (also called a cathode electrode plate). The first electrode plate 2 and the second electrode plate 1 have a thickness of 0.05-0.2 mm. The first electrode plate 2 and the second electrode plate 1 are assembled to form a stacked structure, and are separated by the separator 3 to prevent a short circuit between the second electrode plate 1 and the first electrode plate 2. The two sides of the first electrode plate 2 in the thickness direction are each provided with a separator 3. For ease of distinction, the two separators 3 located on the two sides of the first electrode plate 2 in the thickness direction are referred to as a first separator 32 and a second separator 33 respectively.

The second electrode plate 1 and the first electrode plate 2 are both provided with tabs 15, and the electric energy generated by the cell core 20*c* is transmitted outward through the tabs 15. The tabs 15 of the second electrode plate 1 and the first electrode plate 2 are respectively referred to as a second tab 12 and a first tab 22 for ease of distinction.

The tab 15 is the part of the positive or negative electrode plate of the cell core 20*c* that is coated with no active material 29, extends outwardly from the part of the positive or negative electrode plate that is coated with an active material 29, and is electrically connected to an external circuit via the respective adapter 205 and electrode terminal 206, so as to realize the outward transmission of electric energy. The tab 15 of the negative electrode plate 14 is referred to as a negative tab 13, and the tab 15 of the positive electrode plate 24 is referred to as a positive tab 23.

The adapters 205 are arranged in the shell 202, and are located between the tabs of the cell core 20*c* and the electrode terminals 206, for realizing the electrical connection between the cell core 20*c* and the electrode terminals 206, so that the electric energy generated by the cell core 20*c* is transmitted to the electrode terminals 206. The adapter 205 corresponding to the positive tab is referred to as a positive adapter, and the adapter 205 corresponding to the negative tab is referred to as a negative adapter.

The electrode terminals 206 are electrically connected to the cell core 20*c* via the adapters 205, and are configured to be connected to the external circuit, so as to transmit the electric energy generated by the cell core 20*c* to the outside of the battery cell 20. The electrode terminal 206 corresponding to the negative tab 13 is referred to as a negative terminal 20*a*, and the electrode terminal 206 corresponding to the positive tab 23 is referred to as a positive terminal 20*b*.

It can be seen that the cell core 20*c* is an important component of the battery cell 20, and is the key to enable the battery cell 20 to supply electric energy.

There are mainly two methods for assembling the second electrode plate 1 and the first electrode plate 2 in the cell core 20*c*, namely a winding method and a stacking method. When the second electrode plate 1 and the first electrode plate 2 are assembled together by winding, the corresponding battery cell 20 is referred to as a wound battery; and when the second electrode plate 1 and the first electrode plate 2 are assembled together by stacking, the corresponding battery cell 20 is referred to as a stacked battery.

Regardless of wound batteries or stacked batteries, there is a risk of short circuit caused by foreign matter on the electrode plate. Specifically, there may be foreign matter on the electrode plate. For example, edge burrs or exfoliated edge dressings may be generated during the cutting process of the electrode plate. For another example, dendrites may be generated during the charging and discharging processes of the electrode plate. The foreign matter may pierce the separators 3 between the positive and negative electrode plates, resulting in a short circuit. For example, during the charging process, lithium ions are deintercalated from the positive electrode plate 24 and enter the negative electrode plate 14, and the negative electrode plate 14 will expand after absorbing the lithium ions. At the same time, the positive electrode plate 24 will also expand after the lithium ions are deintercalated. Therefore, during the charging process, the expansion of the positive and negative electrode plates causes the separator 3 between the positive and negative electrode plates to be compressed. In this case, the foreign matter on the positive and negative electrode plates is likely to pierce the separator, resulting in a short circuit and a safety accident.

Therefore, reducing the risk of short circuit caused by the foreign matter on the electrode plate is of great significance for improving the safety of the battery.

In view of the above situation, in order to improve the safety of the battery, referring to FIGS. 3-8, the present application provides an electrode assembly 201. The electrode assembly 201 comprises a first electrode plate 2, a first separator 32 and a second separator 33, The first separator 32 and the second separator 33 are located on two opposite sides of the first electrode plate 2 in a thickness direction, and the first separator 32 and the second separator 33 are both turned over and enclose an edge of the first electrode plate 2 that is provided with no tab 15.

In the related art, the separator 3 is only located between the surfaces of two adjacent electrode plates perpendicular to the thickness direction, but does not wrap around the edges of the electrode plates. In this case, at the edge of the electrode plate, the foreign matter is likely to cause a short circuit problem. However, in the embodiments of the present application, by making the separator 3 wrap around the edge of the first electrode plate 2, the separator 3 can be used to prevent the foreign matter at the edge from conducting electricity between the positive and negative electrodes, thereby effectively reducing the risk of a short circuit accident caused by the foreign matter at the edge. Moreover, since in the embodiments of the present application, the edge of the first electrode plate 2 is not wrapped by only one separator 3, but the edge of the first electrode plate 2 is wrapped by both the two separators 3 on the two sides of the first electrode plate 2 in the thickness direction, namely the first separator 32 and the second separator 33. Even if the foreign matter at the edge of the second electrode plate 1 and/or the first electrode plate 2 pierces one layer of separator 3 wrapped around the edge, there is the other layer of separator 3 wrapped around the edge for prevention. Therefore, the short circuit can be prevented more reliably, and the safety performance can be improved more effectively.

Moreover, since the separators 3 are used to wrap around the edge of electrode plate, and the separators 3 are the original structure of the battery cell 20, there is no need to add other structural components to wrap around the edge of electrode plate, and the structure is thus relatively simple. More importantly, if other structural components are used to wrap around the edge of the electrode plate, then the other structural components are likely to affect the normal transmission of lithium ions, resulting in the prevention of the transmission of the lithium ions in the wrapped region, causing the loss of the overall capacity of the electrode assembly 201 and the battery cell 20. In addition, when the other structural components wrap around the edge of the positive electrode plate, since the lithium at the edge of the wrapped region may still be subjected to deintercalation normally, there is a risk of lithium accumulation in the corresponding negative electrode plate region, so it is likely to cause safety risks. However, in the present application, the use of the separators 3 to wrap around the edge of the electrode plate can effectively solve the corresponding problem, because the separators 3 will not prevent the transmission of lithium ions, so the overall capacity of the electrode assembly 201 and the battery cell 20 will not be reduced, and the risk of lithium accumulation will not be increased. On the contrary, when the separators 3 wrap around the edge of the positive electrode plate 24, the transmission of the lithium ions in the wrapped region of the edge of the positive electrode plate 24 can be slowed down, and the storage of the lithium ions in the edge region can be reduced. In this way, instead, it is beneficial to reduce the risk of lithium precipitation at the edge.

Moreover, since the edge of the first electrode plate 2 wrapped by the two separators 3 is the edge of the first electrode plate 2 that is provided with no tab 15, the normal protruding of the tab of the first electrode plate 2 is not affected.

It can be seen that by making the first separator 32 and the second separator 33 located on the two sides of the same first electrode plate 2 in the thickness direction both fold over and enclose the edge of the first electrode plate 2 that is provided with no tab 15, it is possible that based on a simpler structure, the occurrence of short-circuit accidents caused by the foreign matter at the edge can be prevented reliably while not affecting the utilization of the overall capacity and not increasing the risk of lithium precipitation, thereby effectively improving the safety performance.

When the edge of the first electrode plate 2 is wrapped by two separators 3, all the edges of the first electrode plate 2 that are provided with no tabs 15 can be wrapped, so that the edges of the first electrode plate 2 other than the edge where the tab 15 is located can be wrapped by flangings 31 of the two layers of separator 3, so as to realize the full enclosing and wrapping of all the free edges of each first electrode plate 2, thereby further enhancing the safety performance.

When the first separator 32 and the second separator 33 are being assembled with the first electrode plate 2, hot pressing, bonding or other means may be used to compound the first separator 32 and the second separator 33 on the first electrode plate 2 to enhance the wrapping firmness. Moreover, the degree of intercalation and deintercalation of lithium ions at the edge of the electrode plate can be regulated by adjusting the process of hot pressing or bonding. In particular, the parts of the first separator 32 and the second separator 33 that wrap around the edge of the first electrode plate 2 may be compounded on the first electrode plate 2 by hot pressing, bonding or other means, so that the first separator 32 and the second separator 33 more firmly wrap around the edge of the first electrode plate 2.

The first electrode plate 2 with the edge wrapped by the first separator 32 and the second separator 33 may be either a positive electrode plate 24 or a negative electrode plate 14, and, the first electrode plate 2 may be the electrode plate of a wound battery or the electrode plate of a stacked battery.

When the first electrode plate 2 is the electrode plate of a wound battery, the wrapping of the first separator 32 and the second separator 33 around the first electrode plate 2 may be carried out during winding. That is, during the winding, the two separators 3 on the two sides of the first electrode plate 2 in the thickness direction are turned over to wrap around the edge of the first electrode plate 2. Alternatively, the wrapping may be carried out before the first electrode plate 2 is die-cut, in order to improve the edge wrapping efficiency of the separators.

When the first electrode plate 2 is the electrode plate of a stacked battery, the wrapping of the first separator 32 and the second separator 33 around the first electrode plate 2 may be carried out during or before stacking.

Next, the present application will be described mainly by taking the stacked battery as an example.

Stacked batteries are an important type of battery, having positive and negative electrode plates and separators 3 assembled together using a stacking method. Thanks to the absence of the corners of the wound battery, the stacked battery has a more free and open structure, a higher internal space utilization rate, and a higher energy density, and thus has a better application prospect and is a structural form worthy of promotion.

Generally, the stacking process of the positive and negative electrode plates of the stacked battery uses an individual plate stacking method. That is, in the stacking process, the second electrode plate 1 and the first electrode plate 2 that have been cut are stacked one by one such that the second electrode plate 1 and the first electrode plate 2 are stacked alternately in sequence and separated by the separator 3. In this case, referring to FIGS. 3-8, neither the first electrode plate 2 nor the second electrode plate 1 is folded. For such a stacked battery that uses the individual plate stacking method, referring to FIGS. 7-8, it is possible to turn over the edges of the first separator 32 and the second separator 33 in the stacking process, so as to wrap around the edge of the first electrode plate 2 that is provided with no tab 15.

The individual plate stacking method described above is the stacking method widely used for the stacked battery at present. However, in this individual plate stacking method, what can be done is to stack the first electrode plate 2 and the second electrode plate 1, that have been cut, one by one. In this process, each individual electrode plate needs to be cut, the metal edge being cut will inevitably produce metal burrs and metal debris, and when these metal burrs or debris enter the interior of the stack of the first electrode plate 2 and the second electrode plate 1, there will be a risk of the electrode plates being pierced and short-circuited. In addition, during the stacking, it is necessary to stack the electrode plates one by one, so there is a problem of low production efficiency, which has become an important problem restricting the development of the stacked battery.

In view of the above situation, the present application also improves the structure and the stacking method of the stacked battery, so that the electrode plates of the stacked battery are folded before being stacked, so as to further improve the safety performance of the stacked battery and improve the production efficiency of the stacked battery.

FIG. 9-38 illustratively shows the structure of a stacked battery and its electrode assembly in which the electrode plates are folded first and then stacked. In FIGS. 9-38, in order to clearly reflect the relationship between the first electrode plate 2 and the second electrode plate 1, no separator 3 is shown, but it should be understood that there are separators 3 provided between the first electrode plate 2 and the second electrode plate 1, and the edge of the first electrode plate 2 that is provided with no tab 15 is wrapped by the first separator 32 and the second separator 33.

Referring to FIGS. 9-38, in some embodiments, the electrode assembly 201 comprises a first electrode plate 2 and a second electrode plate 1. The first electrode plate 2 has an opposite polarity to the second electrode plate 1, and is folded once in a first direction Y such that the first electrode plate 2 comprises two first stack sections 21 connected to each other. The second electrode plate 1 is repeatedly folded in a second direction X such that the second electrode plate 1 comprises a plurality of second stack sections 11 connected and stacked in sequence. The first direction Y is perpendicular or parallel to the second direction X. The first stack sections 21 and the second stack sections 11 are stacked alternately in sequence.

Since the second electrode plate 1 is repeatedly folded in the second direction X, involving a Z (or referred to as S or W) folding method, and the first electrode plate 2 is folded once in the first direction Y, involving a U (or referred to as V) half-folding method. Therefore, in the above configuration, the electrode assembly 201 uses a "Z+U" stacking method.

In the "Z+U" stacking method, it is not necessary to stack the electrode plates one by one. Rather, after the second electrode plate 1 is subjected to Z folding and a plurality of first electrode plates 2 are respectively subjected to U half-folding, the plurality of half-folded first electrode plates 2 may be directly inserted into the second electrode plate 1 at the same time, such that the first stack sections 21 and the second stack sections 11 are stacked alternately in sequence. Therefore, compared with the individual plate stacking method, the production efficiency of the electrode assembly 201, the battery cell 20, the battery 10 and the power consuming device 100 can be effectively improved.

Since the second electrode plate 1 uses the Z folding method, the second stack sections 11 are all connected together, and it is not necessary to cut the second electrode plate 1 into second stack sections 11 in advance; and since the first electrode plate 2 uses the U half-folding method, the two first stack sections 21 are connected together, and it is not necessary to cut the first electrode plate 2 into two first stack sections 21 in advance. Therefore, the corresponding cutting step can be omitted, reducing the time required for the cutting process, thereby improving the production efficiency.

Moreover, the first electrode plate 2 uses the U half-folding mode, so during stacking, it is also convenient to simultaneously operate dozens of first electrode plates 2 to insert same into the second electrode plate 1 at the same time, so as to be assembled with the second electrode plate 1 without the need for stacking the first stack sections 21 on the second stack sections 11 one by one. From this point of view, it is also beneficial to improve the production efficiency.

It can be seen that, by using the "Z+U" stacking method, the present application can effectively shorten the time for the cutting process and improve the stacking efficiency, thereby effectively improving the production efficiency of the stacked battery.

In addition, in the "Z+U" stacking method, there is no need to perform cutting between the second stack sections 11 of the second electrode plate 1, and between the two first stack sections 21 of the first electrode plate 2; therefore, compared with the case where the stack sections are disconnected from each other and there are cutouts in the individual plate stacking method, the number of cutouts can be effectively reduced. The reduction in the number of cutouts is beneficial to reduce the probability of occurrence of burrs, reduce the risk of short circuit, and improve the operating safety. The more cutouts, the greater the probability of generation of burrs, and the burrs are likely to pierce the separator 3, resulting in a short circuit between the second electrode plate 1 and the first electrode plate 2. Therefore, the higher the risk of short circuit, the lower the operating safety. In the present application, since the second stack section 11 and the first stack section 21 only need to be cut on three sides without the need for performing cutting on the fourth side, the numbers of cutouts of the second stack section 11 and the first stack section 21 are reduced, so the risk of short circuit is reduced and the operating safety is improved.

It can be seen that, by providing the electrode assembly 201 formed using the "Z+U" stacking method, the present application can not only effectively improve the production efficiency of the stacked battery, but can also effectively improve the operating safety of the stacked battery.

In addition, the "Z+U" stacking method used in the present application is also convenient to improve the heat dissipation performance of the battery cell 20. For example, referring to FIG. 28, in some embodiments, the tab 15 of the first electrode plate 2 is located at the end of the first electrode plate 2 away from the bent portion 25, and the bent portion 25 of the first electrode plate 2 is in contact with an inner wall of the shell 202.

Figure 12:
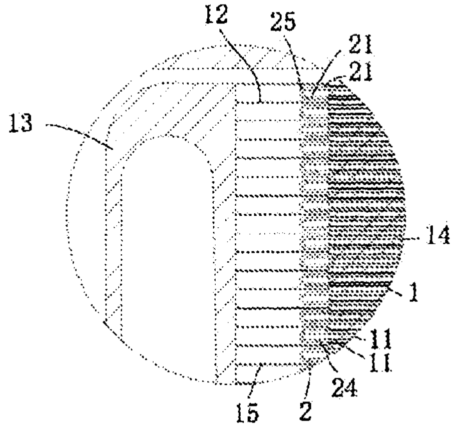
FIG. 12 is a schematic enlarged view of part I in FIG. 11.
Figure 13:
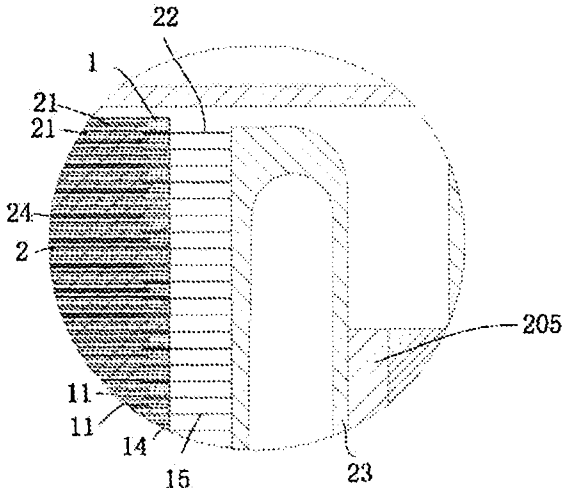
FIG. 13 is a schematic enlarged view of part II of FIG. 11.
Figure 14:
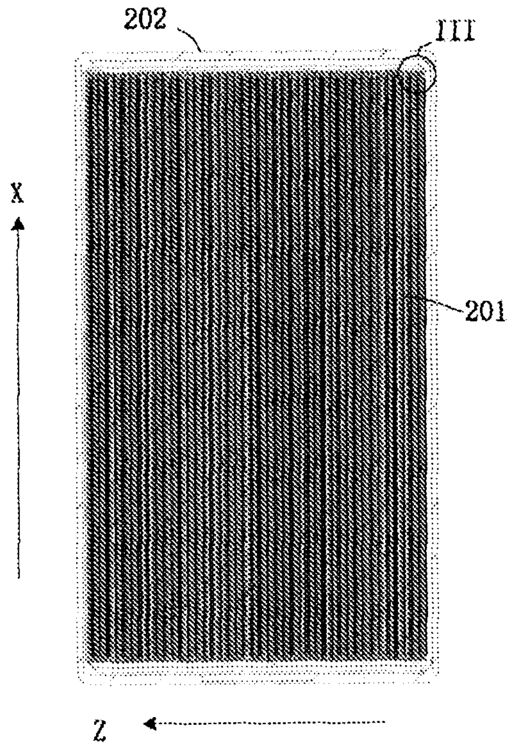
FIG. 14 is a sectional view taken along B-B of FIG. 10.
Figure 15:
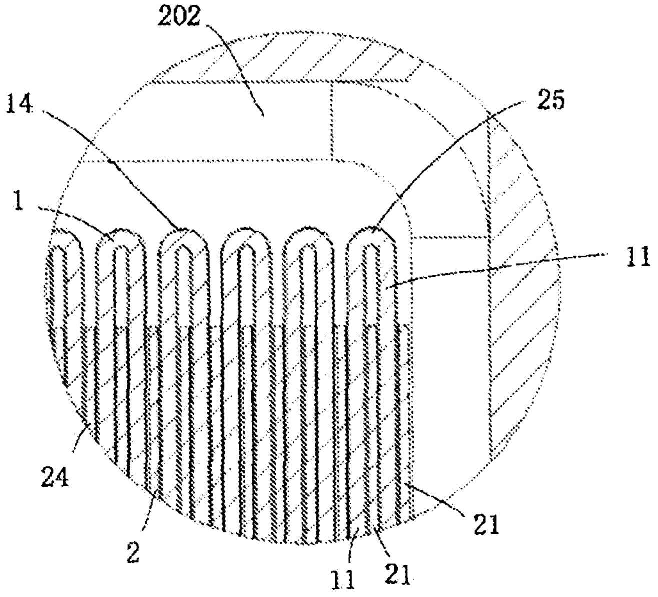
FIG. 15 is a schematic enlarged view of part III of FIG. 14.

It is not difficult to understand that the bent portion 25 refers to the portion of the electrode plate that is subjected to folding. Specifically, the bent portion 25 of the first electrode plate 2 is the part of the first electrode plate 2 that is subjected to folding, or in other words, the part where two first stack sections 21 are connected to each other after the first electrode plate 2 is folded. The bent portion 25 of the second electrode plate 1 is the part of the second electrode plate 1 that is subjected to folding, or in other words, the part where two adjacent second stack sections 11 are connected to each other after the second electrode plate 1 is folded. Referring to FIG. 12, in some embodiments, the bent portion 25 of the first electrode plate 2 is arc-shaped, so that the first electrode plate 2 is roughly U-shaped as a whole. Referring to FIG. 15, in some embodiments, the bent portion 25 of the second electrode plate 1 is arc-shaped, so that the second electrode plate 1 is roughly S-shaped as a whole.

In the related art, an insulating support plate is generally provided between the electrode plate and the shell 202 for receiving the electrode assembly 201, and the two are spaced apart by the insulating support plate and are thus not in direct contact. The insulating support plate supports the electrode assembly 201, and is generally made of an insulating material such as a polymer material. In this case, the heat generated by the electrode assembly 201 is difficult to dissipate quickly, and the heat accumulates in the shell 202, which is likely to cause safety accidents such as overheating and explosion.

Unlike the related art, in the above embodiment, no insulating support plate is provided between the electrode assembly 201 and the shell 202, but the bent portion 25 of the first electrode plate 2 of the electrode assembly 201 that uses a U half-folding method is in contact with the inner wall of the shell 202. In this way, the first electrode plate 2 is generally made of a material having good thermal conductivity such as a metal material, at the same time, the shell 202 for receiving the electrode assembly 201 is generally also made of a metal material having good thermal conductivity such as a metal material (e.g., aluminum), a large number of first electrode plates 2 are provided, and the bent portions 25 of all the first electrode plates 2 are in contact with the inner wall of the shell 202 and the total contact area is thus large; therefore, making the bent portion 25 of the first electrode plate 2 in contact with the inner wall of the shell 202 can realize a high thermal conductivity and a large-area direct-contact heat dissipation process between the electrode assembly 201 and the shell 202, and quickly dissipate the heat generated by the electrode assembly 201 to the outside of the shell 202, so that the heat dissipation performance of the battery cell 20 can be effectively improved, the risk of safety accidents caused by heat accumulation can be reduced, and the operating safety can be improved.

Moreover, in the above embodiment, when the bent portion 25 of the first electrode plate 2 is in contact with the inner wall of the shell 202, the tab 15 of the first electrode plate 2 is arranged at the end of the first electrode plate 2 away from the bent portion 25, so that the bent portion 25 of the first electrode plate 2 in contact with the shell 202 is provided with no tab 15, and the tab 15 of the first electrode plate 2 is located on the opposite side of the bent portion 25. The advantage is that the bent portion 25 provided with no tab 15 is more convenient to contact with the shell 202, and the contact between the bent portion 25 and the shell 202 does not affect the electrical connections between the tab 15 and the adapter 205 and the electrode terminal 206.

It can be seen that by locating the tab 15 of the first electrode plate 2 at the end of the first electrode plate 2 away from the bent portion 25, and making the bent portion 25 of the first electrode plate 2 in contact with the inner wall of the shell 202, it is possible to realize efficient heat dissipation between the electrode assembly 201 and the shell 202 and effectively improve the heat dissipation performance of the battery cell 20 while not affecting the realization of the electric energy transmission function of the first electrode plate 2.

Figure 28:
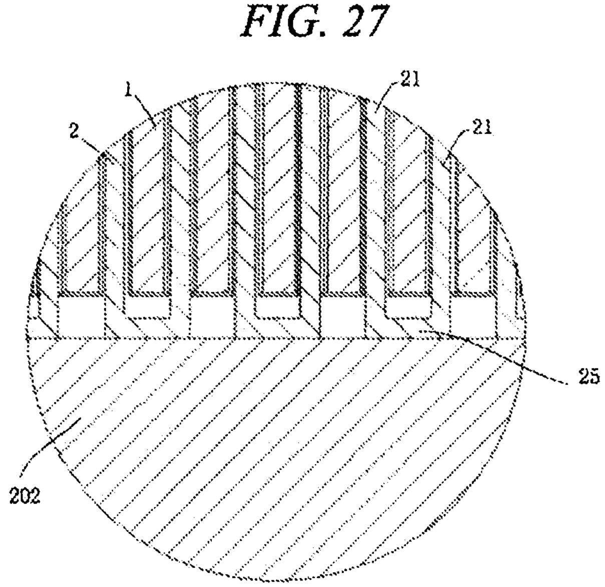
FIG. 28 is a partially enlarged schematic view of the contact between the electrode assembly and a shell body in the third embodiment of the present application.

Referring to FIG. 28, in some embodiments, the surface of the bent portion 25 of the first electrode plate 2 facing away from the second electrode plate 1 faces the direction of gravity. On this basis, the bent portion 25 of the first electrode plate 2 can be more fully in contact with the inner wall of the shell 202 under the action of gravity, and conduct heat more efficiently, thereby facilitating the further improvement of the heat dissipation performance of the battery cell 20.

As mentioned above, in the present application, the second electrode plate 1 and the first electrode plate 2 are the electrode plates having opposite polarities. In some embodiments, the second electrode plate 1 is a positive electrode plate 24, and the first electrode plate 2 is a negative electrode plate 14. In some other embodiments, the second electrode plate 1 is a negative electrode plate 14, and the first electrode plate 2 is a positive electrode plate 24. When the second electrode plate 1 and the first electrode plate 2 are the negative electrode plate 14 and the positive electrode plate 24 respectively, since the second electrode plate 1 uses a Z folding method, and the first electrode plate 2 uses a U half-folding method, it may be expedient that the area of the second electrode plate 1 is designed to be larger than the area of the first electrode plate 2, so that the area of the negative electrode plate 14 is greater than that of positive electrode plate 24. In this way, the negative electrode plate 14 can have a sufficient position to receive lithium ions. Therefore, it is beneficial to prevent the occurrence of lithium precipitation phenomenon.

The lithium precipitation phenomenon refers to the phenomenon that lithium ions are precipitated on the surface of the negative electrode plate because there is no place to accept lithium ions on the negative electrode plate.

The charge-discharge process of a lithium ion battery is exactly the intercalation and deintercalation process of lithium ions on the positive and negative electrode plates which is accompanied by energy absorption and release. When the lithium ion battery is being charged, lithium ions are generated on the positive electrode plate of the lithium battery, and the generated lithium ions move to the negative electrode plate through the electrolyte, and are combined with electrons and intercalated in the active material of the negative electrode plate. The more lithium ions are intercalated, the higher the charge capacity. When the lithium ion battery is being discharged, the lithium ions are deintercalated from the negative electrode plate and move back to the positive electrode plate. The more lithium ions returned to the positive electrode, the higher the discharge capacity. However, if there is no place to accept lithium ions on the negative electrode plate, the lithium ions will be precipitated on the surface of the negative electrode plate (i.e., lithium precipitation) to form lithium dendrites. Once the lithium dendrites pierce the separator and come into contact with the positive electrode plate, a short circuit is caused in the battery, leading to fire or even explosion accidents. It can be seen that the occurrence of lithium precipitation phenomenon affects the safety performance of the lithium ion battery.

When the negative electrode plate 14 uses the Z folding method and the positive electrode plate 24 uses the U half-folding method, thanks to that the area of the negative electrode plate 14 can be expediently larger than the area of the positive electrode plate 24, the occurrence of lithium precipitation phenomenon is prevented, thereby facilitating the further improvement of the operating safety of the stacked battery.

In addition, during stacking, the folding directions of the second electrode plate 1 and the first electrode plate 2 may be perpendicular or parallel to each other, in other words, the second direction X and the first direction Y may be perpendicular or parallel to each other.

When the second direction X and the first direction Y are perpendicular to each other, the folding directions of the second electrode plate 1 and the first electrode plate 2 are perpendicular to each other, and the stacking method in this case can be referred to as an orthogonal "Z+U" stacking method. In this orthogonal "Z+U" stacking method, when the first electrode plate 2 is half-folded and inserted into the folded second electrode plate 1, the bent portion 25 of the first electrode plate 2 straddles and encloses an edge of the second electrode plate 1 that is adjacent to the bent portion 25, and the bent portion 25 of the first electrode plate 2 can provide a certain limiting effect on the second electrode plate 1 in the folding direction of the first electrode plate 2 (i.e., in the first direction Y); moreover, the bent portion 25 of the second electrode plate 1 can enclose the edge of the first electrode plate 2 that is adjacent to its own bent portion 25, and can provide a certain limiting effect on the first electrode plate 2 in the folding direction of the second electrode plate 1 (i.e., in the second direction X); at the same time, one of the first stack sections 21 of the first electrode plate 2 is sandwiched between two adjacent second stack sections 11 of the second electrode plate 1, so that it is also possible to provide a certain limiting effect on the first electrode plate 2 in a third direction Z (which is the stacking direction of the second stack sections 11) perpendicular to both the second direction X and the first direction Y. It can be seen that when the orthogonal "Z+U" stacking method is used, the second electrode plate 1 and the first electrode plate 2 can limit each other, and the two can be limited in more directions, so that the limiting reliability is strong.

When the second direction X and the first direction Y are parallel to each other, the folding directions of the second electrode plate 1 and the first electrode plate 2 are parallel to each other, and the stacking method in this case can be referred to as a parallel "Z+U" stacking method. In this parallel "Z+U" stacking method, when the first electrode plate 2 is half-folded and inserted into the folded second electrode plate 1, the bent portion 25 of the first electrode plate 2 straddles and encloses the bent portion 25 of the second electrode plate 1, so that it is possible to provide a certain limiting effect on the second electrode plate 1 in the folding direction of the first electrode plate 2 (i.e., in the first direction Y); and one of the first stack sections 21 of the first electrode plate 2 is sandwiched between two adjacent second stack sections 11 of the second electrode plate 1, so that it is possible to provide a certain limiting effect on the first electrode plate 2 in the stacking direction of the second stack sections 11 (i.e., in the third direction Z). It can be seen that when the parallel "Z+U" stacking method is used, the second electrode plate 1 and the first electrode plate 2 can also limit each other. Moreover, this parallel "Z+U" stacking method makes the assembly more convenient.

It can be seen that when the "Z+U" stacking method is used, no matter whether it is the orthogonal stacking method with the second direction X being perpendicular to the first direction Y, or the parallel stacking method with the second direction X being parallel to the first direction Y, the second electrode plate 1 and the first electrode plate 2 can limit each other, and the mutual limiting effect between the second electrode plate 1 and the first electrode plate 2 is beneficial to improve the structural reliability of the electrode assembly 201, and it is also convenient to control the area of the part of the negative electrode plate extending beyond the positive electrode plate, thereby facilitating the improvement of the safety performance of the stacked battery.

The part of the negative electrode plate extending beyond the positive electrode plate is also called overhang, which is mainly a concept proposed to improve the safety performance of the lithium ion battery.

As mentioned above, during the charging process of a lithium ion battery, if the area of the negative electrode plate to receive lithium ions is insufficient, lithium precipitation will occur, and if the dendrites generated by the lithium precipitation pierce the separator, the battery cell will be short-circuited, leading to explosion or fire. Therefore, in order to make the negative electrode plate have enough area to receive the lithium ions, to improve the safety of the lithium ion battery, the negative electrode plate generally will be over-designed, that is, the area of the negative electrode plate should be larger than that of the positive electrode plate, and the edge of the negative electrode plate thus generally extends beyond the edge of the positive electrode plate, and consists the part of the negative electrode plate extending beyond the positive electrode plate.

It can be seen that the part of the negative electrode plate extending beyond the positive electrode plate is a size difference design that makes the negative electrode plate extends beyond the positive electrode plate. This size difference design can form a physical isolation between the positive and negative electrodes and prevent the lithium ions from being precipitated from the surface of the negative electrode plate to form lithium dendrites, reducing the risk of short circuit between the positive and negative electrodes, so that the safety performance of the lithium ion battery can be effectively improved.

However, during the design of the part of the negative electrode plate extending beyond the positive electrode plate, there is a difficult problem all the time, that is, the area of the part of the negative electrode plate extending beyond the positive electrode plate is difficult to control. Due to the large number of electrode plates, it is difficult to align the positive electrode plates of different layers and the negative electrode plates of different layers. In addition, the relative position between the positive and negative electrode plates is likely to change due to tape loosening and other reasons.

Therefore, it is quite difficult to control the area of the part of the negative electrode plate extending beyond the positive electrode plate. If the area of the part of the negative electrode plate extending beyond the positive electrode plate cannot be effectively controlled, the area of the part of the negative electrode plate extending beyond the positive electrode plate is likely to be too small or too large, which will adversely affect the performance of the battery. For example, if the area of the part of the negative electrode plate extending beyond the positive electrode plate is too small, the part of the negative electrode plate extending beyond the positive electrode plate is likely to disappear when the positive and negative electrode plates are relatively shifted, resulting in failure of the short circuit prevention effect. For another example, if the area of the part of the negative electrode plate extending beyond the positive electrode plate is too large, the negative electrode plate needs to occupy too much internal space of the lithium battery, which is likely to cause waste of space, resulting in low space utilization rate and affecting the improvement of energy density.

It can be seen that how to effectively control the area of the part of the negative electrode plate extending beyond the positive electrode plate is a comparatively important, but also relatively difficult problem.

However, based on the "Z+U" stacking method of the present application, the limiting effect of the bent portion 25 of the first electrode plate 2 on the second electrode plate 1 then can control the area of the part of the negative electrode plate extending beyond the positive electrode plate.

Figure 18:
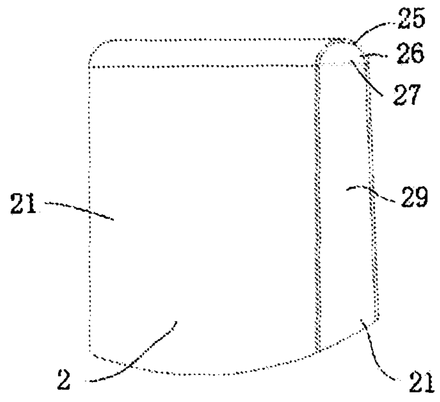
FIG. 18 is a schematic enlarged view of part IV of FIG. 17.
Figure 19:
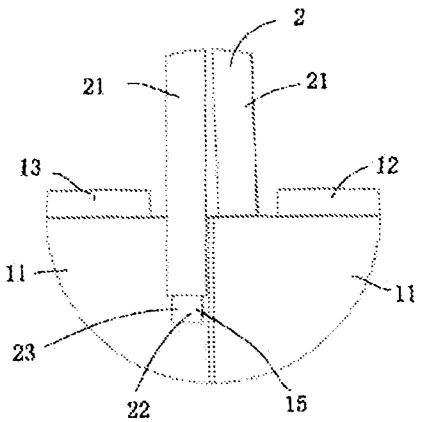
FIG. 19 is a schematic enlarged view of part V of FIG. 17.

For example, referring to FIGS. 12 and 18, in some embodiments, the second electrode plate 1 and the first electrode plate 2 are respectively configured as a negative electrode plate 14 and a positive electrode plate 24, and the first electrode plate 2 is configured to have an inert zone 26. The inert zone 26 comprises the bent portion 25 of the first electrode plate 2, and the inert zone 26 is coated with no active material 29. Illustratively, the dimension of the inert zone 26 in the first direction Y (which is half of the width of the inert zone 26 in the unfolded state) is 1-18 mm. For example, in some embodiments, the dimension of the inert zone 26 in the first direction Y is 3-4 mm.

Since the inert zone 26 of the first electrode plate 2 is coated with no active material 29, the inert zone 26 of the first electrode plate 2 forms an inactive zone, and does not participate in the electrochemical reaction in the charging and discharging processes. In this case, the part of the second electrode plate 1 extending into the corresponding inert zone 26 is the part extending beyond the first electrode plate 2. Moreover, since the second electrode plate 1 and the first electrode plate 2 are respectively the negative electrode plate 14 and the positive electrode plate 24, the part of the second electrode plate 1 extending into the corresponding inert zone 26 is exactly the part of the negative electrode plate 14 extending beyond the positive electrode plate 24, would not be subjected to lithium precipitation, and can constitute the part of the negative electrode plate extending beyond the positive electrode plate. Here, the area of the part of the negative electrode plate extending beyond the positive electrode plate correspondingly depends on the area of the inert zone 26, so it is only necessary to control the size of the region coated with no active material 29 at one end of the bent portion 25 of the first electrode plate 2, that is, the area of the inert zone 26, to realize the effective control over the area of the part of the negative electrode plate extending beyond the positive electrode plate. This is not only simple and convenient, but also has a high control accuracy. During specific assembly, the size of the part of the negative electrode plate 14 extending beyond the positive electrode plate 24 can be controlled by simply inserting the first electrode plate 2 having the processed inert zone 26 in place in the second electrode plate 1, thereby facilitating the accurate control of the area of the part of the negative electrode plate extending beyond the positive electrode plate.

It should be noted that, in FIG. 12, a blank region between the bent portion 25 of the first electrode plate 2 and the end of the second stack section 11 is actually filled with a separator 3, but the corresponding separator part is not shown. That is to say, during the process of inserting the first electrode plate 2 into the second electrode plate 1, the first electrode plate 2 is completely inserted, and the distance between the edge where the bent portion 25 of the first electrode plate 2 is located and the edge of the second electrode plate 1 that is enclosed by the bent portion 25 of the first electrode plate 2 is only approximately the thickness of the separator 3 or a multiple of the thickness of the separator 3.

In addition, the inert zone 26 of the first electrode plate 2 not only facilitates the control of the area of the part of the negative electrode plate extending beyond the positive electrode plate, but also facilitates the improvement of the insulation reliability between the second electrode plate 1 and the first electrode plate 2. For example, referring to FIG. 18, in some embodiments, the surface of the inert zone 26 of the first electrode plate 2 facing the second electrode plate 1 (i.e., the inner surface of the inert zone 26 of the first electrode plate 2) is provided with an insulating material 27. As an example, the insulating material 27 is a ceramic coating or an insulating adhesive (such as insulating glue or insulating tape).

No matter whether the first electrode plate 2 is the positive electrode plate 24 or the negative electrode plate 14, when the surface of the inert zone 26 of the first electrode plate 2 facing the second electrode plate 1 is provided with the insulating material 27, the inert zone 26 can be insulated from the second electrode plate 1 by both the separator 3 and the insulating material 27. Therefore, the insulation between the second electrode plate 1 and the first electrode plate 2 is better, and the occurrence of short circuit accidents can be prevented more reliably, thereby facilitating the further improvement of the operating safety. Since the inert zone 26 is provided with no active material 29, the insulating material 27 is provided in the inert zone 26, and the insulating material 27 will not affect the normal electrochemical reaction. It can be seen that by providing the insulating material 27 on the surface of the inert zone 26 of the first electrode plate 2 facing the second electrode plate 1, it is possible to further improve the insulation between the second electrode plate 1 and the first electrode plate 2 without affecting the normal electrochemical reaction, more effectively improving the operating safety.

In the present application, the tabs of the second electrode plate 1 and the first electrode plate 2 may protrude in various ways.

For example, referring to FIGS. 9-30, in some embodiments, the tab 15 of the second electrode plate 1 is located at the edge of the second electrode plate 1 except for the bent portion 25. Here, the tab 15 of the second electrode plate 1 is not located at the bent portion of the second electrode plate 1, and is less likely to be damaged due to folding. Therefore, compared with the case where the tab 15 of the second electrode plate 1 is located at the bent portion 25 of the second electrode plate 1, the reliability is higher.

For another example, referring to FIGS. 9-30, in some embodiments, the tab 15 of the first electrode plate 2 is located at an edge of the first electrode plate 2 except for the bent portion 25. Here, the tab 15 of the first electrode plate 2 is not located at the bent portion 25 of the first electrode plate 2, and is less likely to be damaged due to folding. Therefore, compared with the case where the tab 15 of the first electrode plate 2 is located at the bent portion 25 of the first electrode plate 2, the reliability is higher. Moreover, when the tab 15 of the first electrode plate 2 is located at the edge except for the bent portion 25 rather than at the bent portion 25, it is convenient for the bent portion 25 of the first electrode plate 2 to be in contact with the inner wall of the shell 202 to conduct heat. At the same time, the tab 15 of the first electrode plate 2 being not located at the bent portion 25 of the first electrode plate 2 also facilitates the use of the bent portion 25 of the first electrode plate 2 to limit the second electrode plate 1. Since the tab 15 generally protrudes by a long distance and has a relatively soft hardness, if the tab 15 of the first electrode plate 2 is located at the bent portion 25, it means that the bent portion 25 needs to protrude by a long distance and have a relatively soft hardness. In this case, it is difficult for the bent portion 25 of the first electrode plate 2 to effectively limit the second electrode plate 1.

For another example, referring to FIGS. 9-30, in some embodiments, the tabs 15 of the second electrode plate 1 and the first electrode plate 2 are each located at the edge except for the bent portion 25. In this case, the tabs of the second electrode plate 1 and the first electrode plate 2 are both less likely to be damaged due to folding, and the reliability is thus higher.

As an example, where the tabs 15 of the second electrode plate 1 and the first electrode plate 2 are each located at the edge except for the bent portion 25, referring to FIGS. 9-26, the first direction Y is perpendicular to the second direction X, the tab 15 of the second electrode plate 1 is located at the edge of the second electrode plate 1 adjacent to the bent portion 25, and the tab 15 of the first electrode plate 2 is located at the end of the first electrode plate 2 away from the bent portion 25.

In the above example, since the first direction Y is perpendicular to the second direction X, what is used between the second electrode plate 1 and the first electrode plate 2 is an orthogonal "Z+U" stacking method. Moreover, since the tab 15 of the second electrode plate 1 is located at the edge of the second electrode plate 1 adjacent to the bent portion 25, and the tab 15 of the first electrode plate 2 is located at the end of the first electrode plate 2 away from the bent portion 25, the protruding directions of the tabs 15 of the second electrode plate 1 and the first electrode plate 2 (referred to as the tab protruding directions) are both in the folding direction of the first electrode plate 2 (i.e., in the first direction Y). It can be seen that, in an orthogonal "Z+U" stacking method used by the second electrode plate 1 and the first electrode plate 2 of the electrode assembly 201 of the above example, the tabs protrude in the folding direction of the first electrode plate 2. In this case, the tabs of the second electrode plate 1 and the first electrode plate 2 may protrude on the same side or on different sides in the first direction Y, facilitating meeting the design requirements of the battery cell with positive and negative terminals arranged on the same side or on the different sides.

As a specific implementation of the above example, referring to FIGS. 9-19, in some embodiments, the first direction Y is perpendicular to the second direction X; and among any two adjacent second stack sections 11, only one second stack sections 11 is provided with a tab 15, and the bent portion 25 of the first electrode plate 2 encloses the second stack section 11 that is provided with no tab 15. On the basis of this configuration, the second electrode plate 1 uses the method in which the tabs protrude at intervals, that is, a tab 15 protrudes every other second stack section 11. Since, in this case, the second stack section 11 provided with no tab can provide a space reserved for the tab 15 of the first electrode plate 2, simply by making the tab protruding direction of the second stack section 11 having the protruding tab opposite to the tab protruding direction of the first electrode plate 2, that is, simply by protruding the tabs of the second electrode plate 1 and the first electrode plate 2 on the two opposite sides in the first direction Y, the positive and negative tabs can be physically isolated from each other to prevent a short circuit between the positive and negative tabs, which is simple and convenient.

Figure 29:
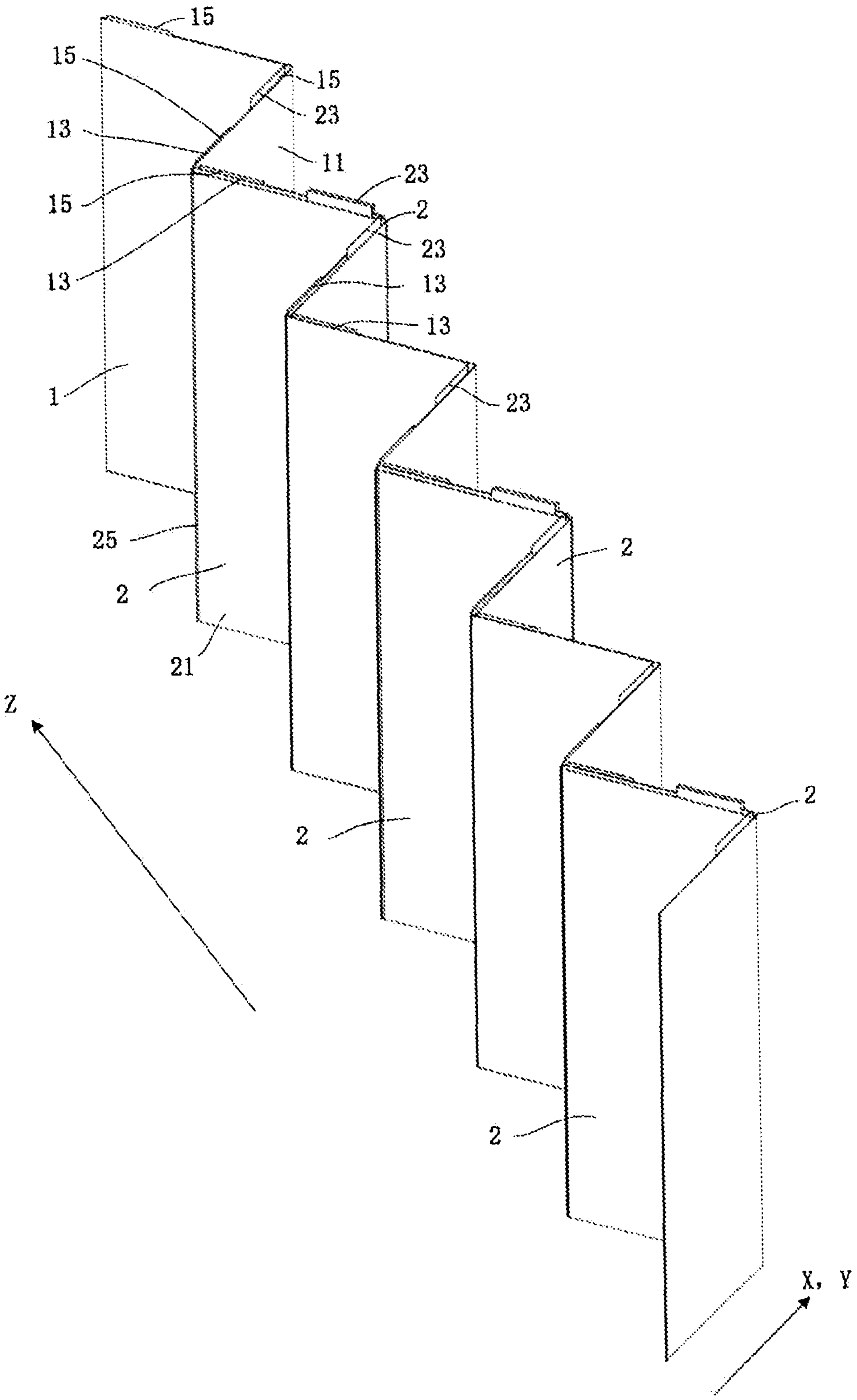
FIG. 29 is a schematic perspective view of an electrode assembly in a fourth embodiment of the present application.
Figure 30:
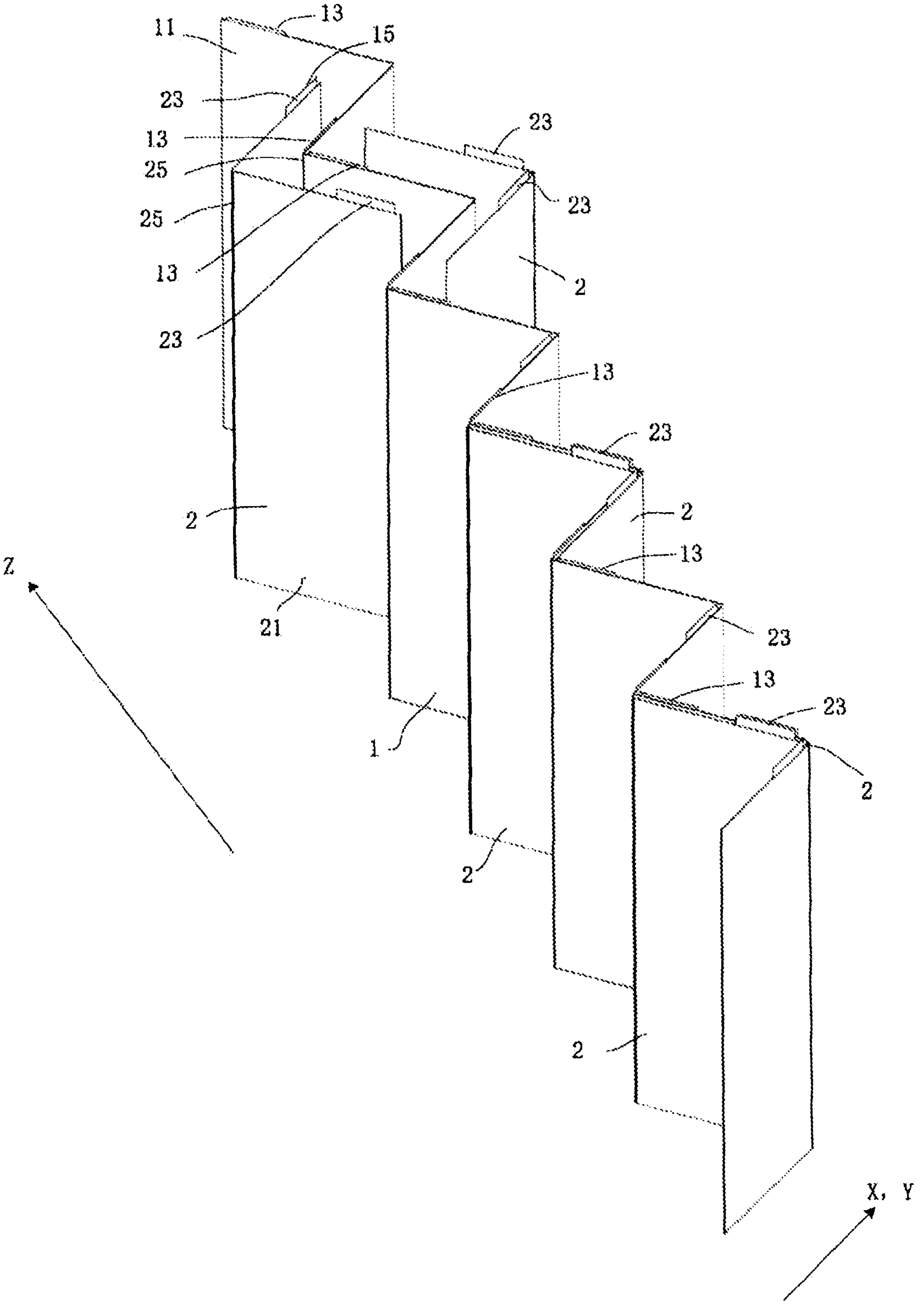
FIG. 30 is a schematic diagram of a stacking process of a second electrode plate and a first electrode plate in the fourth embodiment of the present application.

As another example, where the tabs 15 of the second electrode plate 1 and the first electrode plate 2 are each located at the edge except for the bent portion 25, referring to FIG. 29-30, the first direction Y is parallel to the second direction X, the tab 15 of the second electrode plate 1 is located at the edge of the second electrode plate 1 adjacent to the bent portion 25, and the tab 15 of the first electrode plate 2 is located at the edge of the first electrode plate 2 adjacent to the bent portion 25.

In the above example, since the first direction Y is parallel to the second direction X, what is used between the second electrode plate 1 and the first electrode plate 2 is a parallel "Z+U" stacking method. Moreover, since the tab 15 of the second electrode plate 1 is located at the edge of the second electrode plate 1 adjacent to the bent portion 25, and the tab 15 of the first electrode plate 2 is located at the edge of the first electrode plate 2 adjacent to the bent portion 25, the tab protruding directions of the second electrode plate 1 and the first electrode plate 2 are both perpendicular to the folding direction of the first electrode plate 2 (i.e., in the first direction Y, which is also the second direction X in this example). It can be seen that, in an orthogonal "Z+U" stacking method used by the second electrode plate 1 and the first electrode plate 2 of the electrode assembly 201 of the above example, the tabs protrude in a direction perpendicular to the folding direction of the first electrode plate 2. In this case, the tabs of the second electrode plate 1 and the first electrode plate 2 may protrude on the same side or on different sides in a direction perpendicular to the first direction Y (in this example, the first direction Y is consistent with the second direction X) and the third direction Z, facilitating meeting the design requirements of the battery cell with positive and negative terminals arranged on the same side or on the different sides.

It can be seen that no matter whether in the orthogonal "Z+U" stacking method or in the parallel "Z+U" stacking method, the tab 15 of the second electrode plate 1 and the tab 15 of the first electrode plate 2 can be both located on the same side or on the two opposite sides, that is, the tabs of the second electrode plate 1 and the first electrode plate 2 can both protrude on the same side or on different sides, thereby facilitating meeting the design requirements of the battery cell with positive and negative terminals arranged on the same side or on the different sides.

When the tab 15 of the second electrode plate 1 and the tab 15 of the first electrode plate 2 are located on the same side, it is more convenient for the bent portion 25 of the first electrode plate 2 to be in contact with the inner wall of the shell 202 to conduct heat, and the tab 15 of the second electrode plate 1 and the tab 15 of the first electrode plate 2 here may be arranged staggered in the second direction X to prevent the positive and negative tabs from interfering with each other.

Referring to FIGS. 12-38, in the present application, at least one of the two first stack sections 21 of the first electrode plate 2 is provided with a tab 15, that is to say, among the two first stack sections 21 of the first electrode plate 2, only one first stack section 21 is provided with a tab 15, or the two first stack sections 21 of the first electrode plate 2 are both provided with tabs 15. When only one first stack section 21 of the two first stack sections 21 of the first electrode plate 2 is provided with a tab 15, the two first stack sections 21 are connected together via the bent portion 25, and two first stack sections 21 thus may share one tab 15 to transmit electric energy outward. The first stack section 21 provided with no tab 15 can transmit electric energy to the first stack section 21 provided with the tab 15 through the bent portion 25, and the tab 15 of the first stack section 21 provided with the tab 15 transmits the electric energy outward. In this case, the first electrode plate 2 only needs one tab 15 to complete the outward transmission of electric energy, so the structure is relatively simple. When the two first stack sections 21 of the first electrode plate 2 are both provided with tabs 15, the first electrode plate 2 can transmit electric energy outward through the two tabs 15, and the electric energy transmission efficiency is higher. Moreover, the tabs 15 of the two first stack sections 21 can serve as backups for each other, so that when the tab 15 of one of the first stack sections 21 fails, the first electrode plate 2 can still transmit electric energy normally through the tab 15 of the other first stack section 21. Therefore, the operating reliability of the first electrode plate 2, the electrode assembly 201, the battery cell 20, the battery 10 and the power consuming device 100 can also be effectively improved.

Since in each embodiment shown in FIGS. 9-30, the first electrode plate 2 is first folded, and then assembled together with other electrode plates. For such a first electrode plate 2 that needs to be folded, when the separator 3 is used to wrap around the edge of the first electrode plate 2, the separator 3 may wrap the edge of the first electrode plate 2 that is provided with no tab 15 before the first electrode plate 2 is folded, so as to facilitate the folding of the first electrode plate 2.

Since in each embodiment shown in FIGS. 9-30, the second electrode plate 1 uses the Z folding method, and the first electrode plate 2 uses the U half-folding method, it is simpler and more convenient to use the separators 3 to wrap around the edge of the first electrode plate 2 compared with the situation where the edge of the second electrode plate 1 is wrapped by the separators 3.

In addition, in each embodiment shown in FIGS. 9-30, the second electrode plate 1 and the first electrode plate 2 both need to be folded first, and then can be assembled together. Therefore, to facilitate the folding of the second electrode plate 1 and/or the first electrode plate 2, referring to FIGS. 31-38, in some embodiments, the second electrode plate 1 and/or the first electrode plate 2 are/is provided with a folding guide portion 28, for guiding the folding of the second electrode plate 1 and/or the first electrode plate 2.

Under the guidance of the folding guide portion 28, the second electrode plate 1 and/or the first electrode plate 2 can be folded more conveniently, facilitating the further improvement of the production efficiency of the stacked battery.

The folding guide portion 28 may have various structures. For example, referring to FIGS. 31-38, in some embodiments, the folding guide portion 28 comprises an indentation 281 or a crease 282. The provided indentation 281 or crease 282 can effectively provide a folding guidance function, so that the second electrode plate 1 and/or the first electrode plate 2 can be folded along the corresponding indentation 281 or crease 282, the folding can be completed quickly, and the folding position is less likely to deviate. It can be understood that the indentation 281 is an indented trace, which is recessed downward from the indented surface to become a weakened portion with a certain depth. The crease 282 is a folding trace, which is not recessed downward from the folded surface, and has no depth.

In addition, the folding guide portion 28 may have various shapes. For example, referring to FIGS. 31-38, in some embodiments, the folding guide portion 28 is in the form of a continuous line or a discontinuous line.

When the folding guide portion 28 is in the form of a continuous line, the folding guide portion 28 has a simple structure and is convenient to machine. Illustratively, the folding guide portion 28 in the form of a continuous line is a continuous straight line or a continuous curve.

When the folding guide portion 28 is in the form of a discontinuous line, the area occupied by the folding guide portion 28 is small, which is beneficial to improve the structural strength of the electrode plate as much as possible while facilitating the folding of the electrode plate. Illustratively, the folding guide portion 28 in the form of a discontinuous line is in the form of a broken line. For example, referring to FIGS. 34-37, in some embodiments, the folding guide portion 28 is in the form of a dotted line or a dashed line. The broken line is easier to machine than other types of discontinuous lines. Especially, the machining of the dotted line and the dashed line is more convenient.

The folding guide portion 28 provided in the above embodiments may be parallel to a width direction of the second electrode plate 1 and/or the first electrode plate 2, or inclined relative to the width direction of the second electrode plate 1 and/or the first electrode plate 2. It can be understood that the width direction of the second electrode plate 1 and/or the first electrode plate 2 refers to the extension direction of the shorter side of the surface of the second stack section 11 and/or the first stack section 21 perpendicular to the thickness direction, and is also referred to as a transverse direction of the second electrode plate 1 and/or the first electrode plate 2, which is perpendicular to a longitudinal direction of the second electrode plate 1 and/or the first electrode plate 2. The longitudinal direction of the second electrode plate 1 and/or the first electrode plate 2 is the extension direction of the longer side of the surface of the second stack section 11 and/or the first stack section 21 perpendicular to the thickness direction. For the second electrode plate 1, its width direction is also the extension direction of the two edges of the second stack section 11 adjacent to the bent portion 25. For the first electrode plate 2, its width direction is also the relative arrangement direction of the two edges of the first stack section 21 adjacent to the bent portion 25.

Referring to FIGS. 31-37, when the folding guide portion 28 is parallel to the width direction of the corresponding electrode plate, the folding guide portion 28 is convenient to machine.

Figure 38:
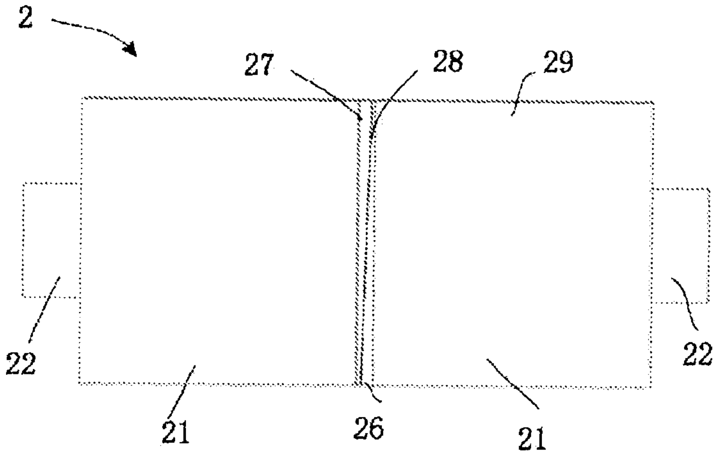
FIG. 38 is a variant of the first electrode plate shown in FIG. 31.

Referring to FIG. 38, when the folding guide portion 28 is inclined relative to the width direction of the corresponding electrode plate, the folding guide portion 28 has a deflection angle, and can guide the corresponding electrode plate to be deflected and half-folded, such that the two adjacent stack sections obtained after folding are staggered in the width direction. When this deflected folding guide portion 28 is provided on the first electrode plate 2 that is the positive electrode plate 24, the two first stack sections 21 of the positive electrode plate 24 can be staggered in the width direction, so that, since the two first stack sections 21 are not completely aligned and in close contact with each other, it is more convenient to insert the first electrode plate 2 into the second electrode plate 1, and it is also convenient to control the relative positional relationship of the first electrode plate 2 with respect to the second electrode plate 1 after insertion into the second electrode plate 1, such that the two first stack sections 21 of the positive electrode plate 24 are as far as possible from the non-continuous end of the negative electrode plate 14, and as close as possible to the continuous end of the negative electrode plate 14, that is, the two first stack sections 21 of the positive electrode plate 24 are as close as possible to the bent portion 25 of the negative electrode plate 14, and away from the open end of the negative electrode plate 14, so that the positive electrode plate 24 is less likely to extend beyond the negative electrode plate 14 in the width direction, which is beneficial to prevent the lithium precipitation problem caused by the positive electrode plate 24 extending beyond the negative electrode plate 14 in the width direction, thereby facilitating the further improvement of the operating safety.

Next, the examples shown in FIGS. 3-38 will be further described.

Figure 11:
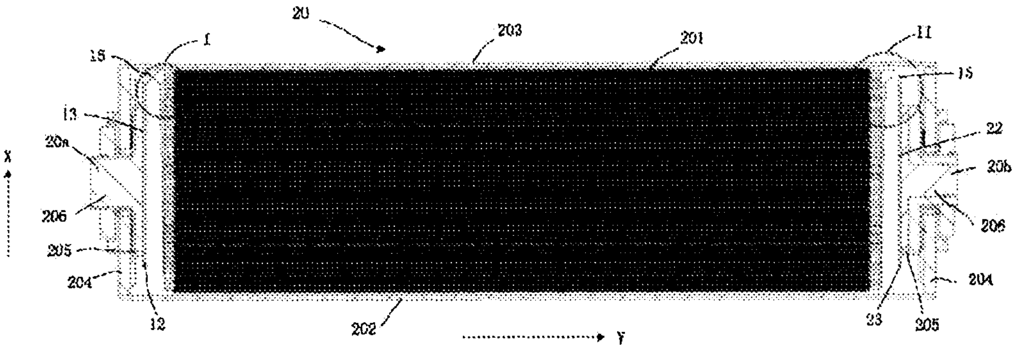
FIG. 11 is a sectional view taken along A-A of FIG. 10.

In order to simplify the description and facilitate understanding, in the following description, the orientations up, down, left, and right will be defined based on the orientations up, down, left, and right in FIG. 11. The orientations up, down, left, and right in FIG. 11 are consistent with those in FIGS. 3 and 20, and conform to the orientations and positional relationship when the battery cell 20 and the battery 10 are normally arranged in the vehicle. The orientation up is a direction opposite to the direction of gravity, and the orientation down is the same direction as the direction of gravity.

A first embodiment shown in FIGS. 3-8 will first be described.

As shown in FIGS. 3-8, in the first embodiment, the battery cell 20 is a square stacked battery, which uses the individual plate stacking method, and transmits electric energy outward from two opposite sides.

Figure 3:
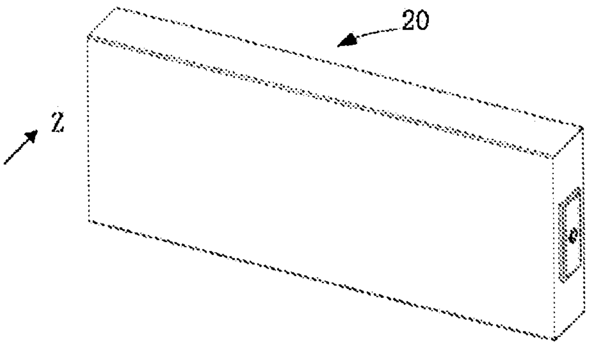
FIG. 3 is a schematic perspective view of a battery cell in a first embodiment of the present application.
Figure 4:
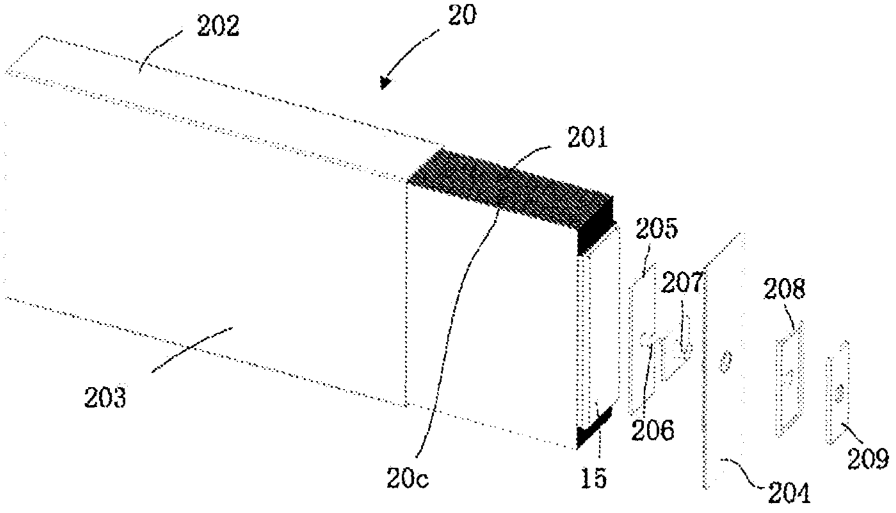
FIG. 4 is a schematic exploded view of the battery cell in the first embodiment of the present application.
Figure 5:
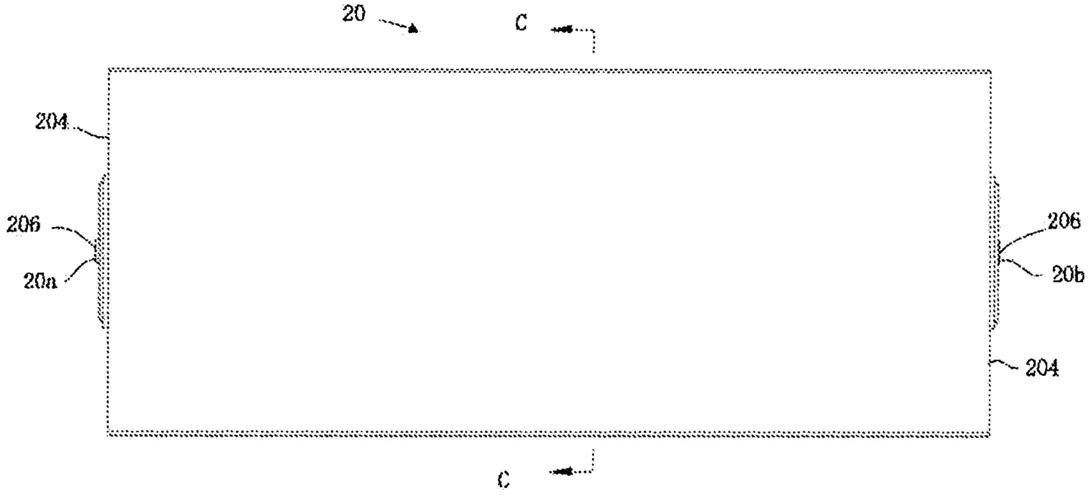
FIG. 5 is a front view of the battery cell in the first embodiment of the present application.

As shown in FIGS. 3-5, in the second embodiment, the shell 202 of the battery cell 20 is square, and the left and right ends of the shell body 203 thereof are each provided with an end cap 204, and the two end caps 204 are detachably connected to the left and right ends of the shell body 203, such that a closed space for receiving the electrode assembly 201, the electrolyte and others is formed inside the shell 202.

The two end caps 204 are each provided with an electrode terminal 206, so that the two electrode terminals 206 of the battery cell 20 are located on the left and right sides of the shell 202. The two electrode terminals 206 respectively pass through the two end caps 204 and are connected to the external circuit. Specifically, as shown in FIGS. 4-5, the negative terminal **20*a* is arranged on the left end cap 204, and the positive terminal 20*b* is arranged on the right end cap 204. The negative terminal 20*a* and the positive terminal 20*b* respectively pass through the corresponding end cap 204 to the outside, and pass through a sheath 207, the end cap 204, an insulator 208 and a pressing plate 209 in sequence during the process of passing through the end cap 204**.

It can be seen from FIGS. 4-5 that in this embodiment, the tabs 15 of the electrode assembly 201 are arranged on the left and right sides of the electrode assembly 201, in order to realize the electrical connection with the two electrode terminals 206 on the left and right sides. The negative tab 13 is arranged on the left side of the electrode assembly 201, and is electrically connected to the left negative terminal **20*a* via the left adapter 205; and the positive tab 23 is arranged on the right side of the electrode assembly 201, and is electrically connected to the right positive terminal 20*b* via the right adapter 205. In this way, the electric energy generated by the electrode assembly 201** can be transmitted outward from the two opposite sides in the left-right direction.

Figure 6:
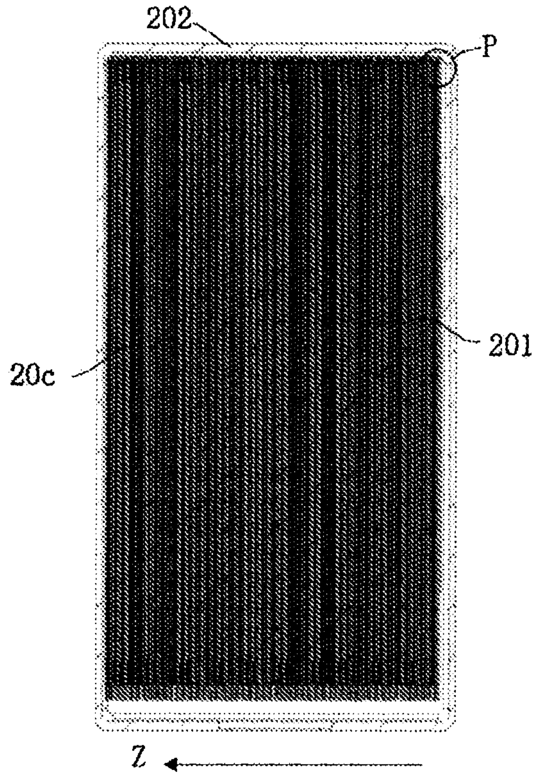
FIG. 6 is a sectional view taken through C-C of FIG. 5.
Figure 7:
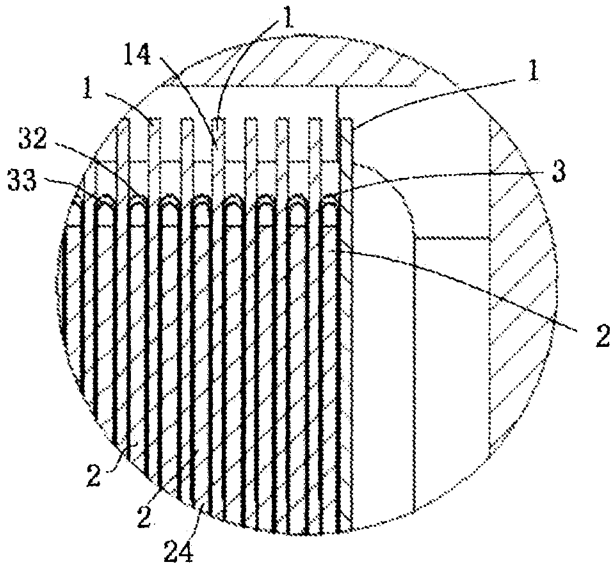
FIG. 7 is a schematic enlarged view of part P of FIG. 6.
Figure 8:
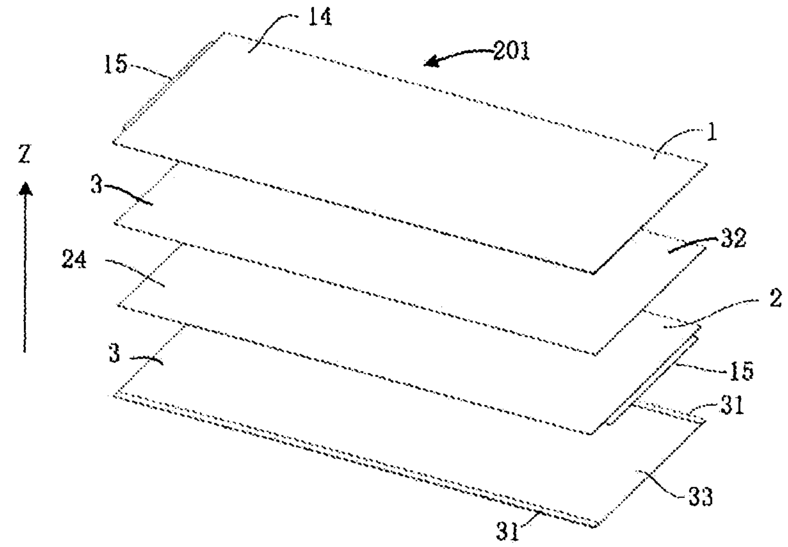
FIG. 8 is a schematic exploded view of an electrode assembly in the first embodiment of the present application.
Figure 9:
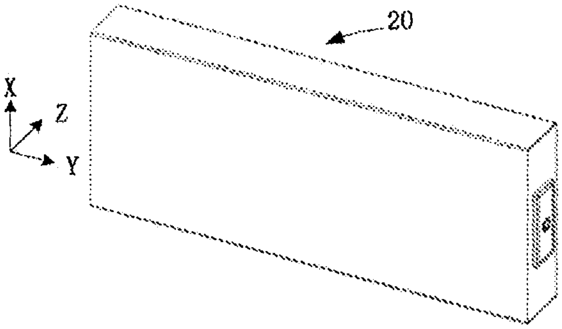
FIG. 9 is a schematic perspective view of a battery cell in a second embodiment of the present application.
Figure 10:
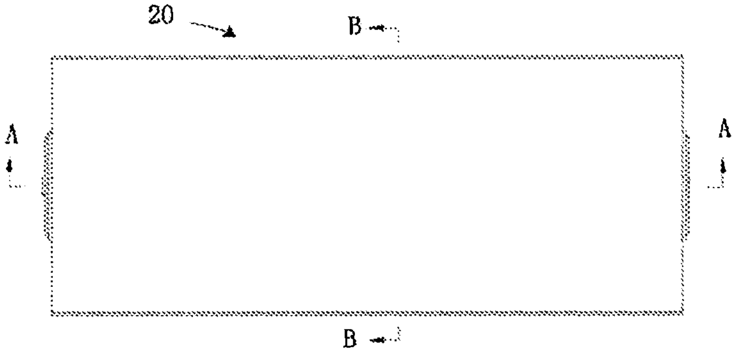
FIG. 10 is a front view of the battery cell in the second embodiment of the present application.

As shown in FIGS. 6-8, in this embodiment, the electrode assembly 201 comprises a second electrode plate 1, a first electrode plate 2 and separators 3. The second electrode plate 1, the first electrode plate 2 and the separators 3 are alternately stacked together to form the electrode assembly 201, and the electrode assembly 201 here is also generally referred to as a cell core **30*c***.

It can be seen from FIGS. 7-8 that in this embodiment, the first electrode plate 2 and the second electrode plate 1 are stacked using an individual plate stacking method, and the first electrode plate 2 and the second electrode plate 1 are not folded before stacking, but are directly stacked after being cut. Two sides of the thickness direction of each first electrode plate 2 are each provided with a separator 3, namely a first separator 31 and a second separator 32. The first separator 31 and the second separator 32 are both turned over to form flangings 31, and the flangings 31 of the first separator 31 and the second separator 32 both wrap around the edge of the first electrode plate 2 that is provided with no tab 15, so that the edge of the first electrode plate 2 that is provided with no tab 15 is wrapped by the flangings 31 of the two layers of separators 3. The flanging 31 encloses a region within 1-20 mm near the edge of the first electrode plate 2. It can be understood that the thickness direction of the first electrode plate 2 is also the stacking direction of the first electrode plate 2 and the second electrode plate 1, which is labeled as the third direction Z in FIGS. 3 and 8. In other words, the third direction Z is the thickness directions of the first electrode plate 2 and the second electrode plate 2, and is also the stacking direction of the first electrode plate 2 and the second electrode plate 1.

During the enclosing, the first separator 32 located on a first side of the first electrode plate 2 may be turned over first, such that the over-turned flanging 31 passes around the surface of the first electrode plate 2 corresponding to the corresponding edge to a second side of the first electrode plate 2, and covers a region within 1-20 mm near the corresponding edge of the surface on the second side to form an inner edge wrapping; then the second separator 33 located on the second side of the first electrode plate 2 is turned over, such that the over-turned flanging 31 passes around the surface of the first electrode plate 2 corresponding to the corresponding edge to the first side of the first electrode plate 2, and covers a region within 1-20 mm near the corresponding edge of the surface on the first side to form an outer edge wrapping outside the inner edge wrapping, so that double layers of edge wrappings of the separators are obtained. After the edge wrapping is completed for each layer of separator, the edge wrapping region of the separator may be fixed by means of hot pressing, adhesive bonding, etc. Moreover, the corresponding edge wrapping process can be completed during the stacking or before the cutting of the first electrode plate 2.

With the provision of the two layers of edge wrappings of the separators, the occurrence of short-circuit accidents caused by the foreign matter at the edge can be prevented more reliably while not affecting the utilization of the overall capacity and not increasing the risk of lithium precipitation. Therefore, compared with the case where the separator 3 does not wrap around the edge of the first electrode plate 2, the safety performance can be effectively improved.

As shown in FIG. 8, in this embodiment, the tabs of both the first electrode plate 2 and the second electrode plate 1 protrude on a single side, and the tab protruding directions of the two are opposite to each other. The tab 15 of the first electrode plate 2 is located on the right side, and the tab 15 of the second electrode plate 1 is located on the left side. In this case, there are three edges of the first electrode plate 2 and the second electrode plate 1 that are provided with no tabs 15. The three edges of the first electrode plate 2 that are provided with no tabs 15 comprise two edges adjacent to the edge of the first electrode plate 2 that is provided with the tab 15, and one edge that is opposite to the edge of the first electrode plate 2 that is provided with the tab 15. In FIG. 8, the first separator 32 and the second separator 33 only wrap around the two edges of the first electrode plate 2 adjacent to the edge provided with the tab 15 in a double-layered manner, but it should be understood that the first separator 32 and the second separator 33 may also wrap around the three edges of the first electrode plate 2 that are provided with no tabs 15 in a double-layered manner, to more reliably prevent a short circuit and more effectively improve the safety performance.

Next, a second embodiment shown in FIGS. 9-19 will be described.

As shown in FIGS. 9-19, in the second embodiment, the battery cell 20 is a square stacked battery, and transmits electric energy outward from two opposite sides.

As shown in FIGS. 9-13, in the second embodiment, the shell 202 of the battery cell 20 is square, and the left and right ends of the shell body 203 thereof are each provided with an end cap 204, and the two end caps 204 are detachably connected to the left and right ends of the shell body 203, such that a closed space for receiving the electrode assembly 201, the electrolyte and others is formed inside the shell 202.

The two end caps 204 are each provided with an electrode terminal 206, so that the two electrode terminals 206 of the battery cell 20 are located on the left and right sides of the shell 202. Specifically, as shown in FIG. 11, the negative terminal **20*a* is arranged on the left end cap 204, and the positive terminal 20*b* is arranged on the right end cap 204**.

As shown in FIG. 11, in this embodiment, the tabs 15 of the electrode assembly 201 are arranged on the left and right sides of the electrode assembly 201, in order to realize the electrical connection with the two electrode terminals 206 on the left and right sides. Specifically, it can be seen from FIGS. 11-12 that the negative tab 13 is arranged on the left side of the electrode assembly 201, and is electrically connected to the left negative terminal **20*a* via the left adapter 205; and it can be seen from FIGS. 11 and 13 that the positive tab 23 is arranged on the right side of the electrode assembly 201, and is electrically connected to the right positive terminal 20*b* via the right adapter 205. In this way, the electric energy generated by the electrode assembly 201** can be transmitted outward from the two opposite sides in the left-right direction.

FIGS. 11-19 show the structure and stacking process of the electrode assembly 201 in this embodiment.

As shown in FIGS. 11-19, in this embodiment, the electrode assembly 201 comprises a second electrode plate 1, a first electrode plate 2 and separators 3. The second electrode plate 1, the first electrode plate 2 and the separators 3 are alternately stacked together to form the electrode assembly 201, and the electrode assembly 201 here is also generally referred to as a cell core **30*c***.

It can be seen from FIGS. 11-19 that in this embodiment, the second electrode plate 1 and the first electrode plate 2 are respectively a negative electrode plate 14 and a positive electrode plate 24. In this case, the active material 29 coated on the surface of the second electrode plate 1 is a positive electrode active material, for example, one or more of lithium cobalt oxide ($LiCoO2$), lithium manganese oxide, lithium iron phosphate, nickel cobalt manganese metal oxide (NCM), a current collector of the second electrode plate 1 for carrying the active material 29 is a positive current collector such as an aluminum foil, and the tab 15 of the second electrode plate 1 is a negative tab 13; at the same time, the active material 29 coated on the surface of the first electrode plate 2 is a negative electrode active material such as graphite, a current collector of the first electrode plate 2 for carrying the active material 29 is a negative current collector such as a copper foil, and the tab 15 of the first electrode plate 2 is a positive tab 23.

Moreover, as shown in FIGS. 11-19, in this embodiment, the second electrode plate 1 uses the Z folding method, the first electrode plate 2 uses the U half-folding method, the folding direction (i.e., the second direction X) of the second electrode plate 1 is in the up-down direction, and the half-folding direction (i.e., the first direction Y) of the first electrode plate 2 is in the left-right direction, so that the second direction X and the first direction Y are orthogonal to each other, resulting in an orthogonal "Z+U" stacking method. After the second electrode plate 1 is Z folded, a plurality of second stack sections 11 are formed, which are connected via bent portions 25. After the first electrode plate 2 is U half-folded, two first stack sections 21 are formed, which are connected via a bent portion 25. A plurality of folded first electrode plates 2 are inserted into the second electrode plate 1, such that the second stack sections 11 and the first stack sections 21 are stacked alternately in sequence in the third direction Z. The third direction Z is in the thickness direction of each stack section. Specifically, in this embodiment, the third direction Z is perpendicular to the second direction X and the first direction Y.

Figure 16:
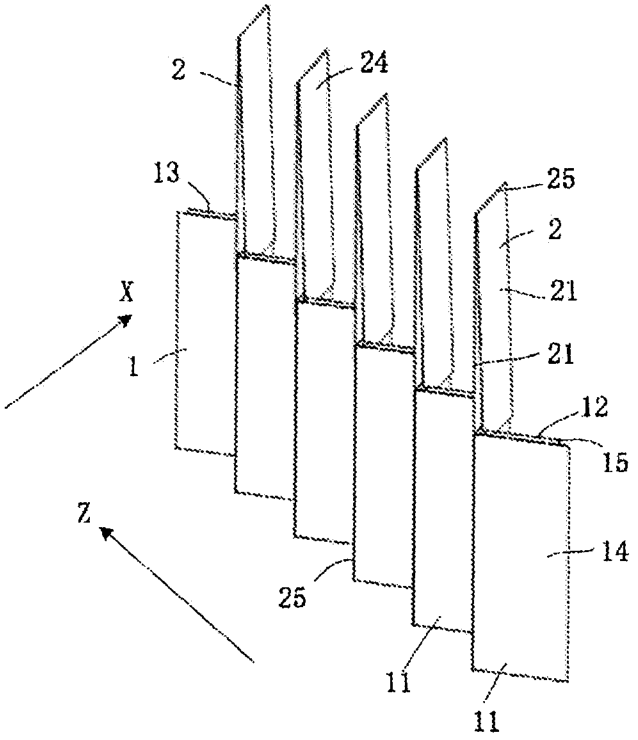
FIG. 16 is a schematic diagram of a stacking process of a first electrode plate and a second electrode plate in the second embodiment.

It can be seen from FIGS. 11-19 that in this embodiment, the second electrode plate 1, which is configured as the negative electrode plate 14, uses a method in which the tabs protrude at intervals, that is, among the second stack sections 11 of the second electrode plate 1, a tab 15 protrudes every other second stack section 11, and among two adjacent second stack sections 11, only one second stack section 11 is provided with a tab 15. Moreover, as shown in FIGS. 11-12 and 16-17, in this embodiment, the second stack section 11 provided with the tab 15 only has the tab protruding on one side in the first direction Y, so that the tab of the second electrode plate 1 only protrudes on one side in the first direction Y, and at this time, the tab protruding method of the second electrode plate 1 is single-side tab protruding. Specifically, as shown in FIGS. 11-12, the tabs 15 of the second electrode plate 1 are all located at the left end of the second electrode plate 1. To be precise, each tab 15 of the second electrode plate 1 is located at the left edge of the respective second stack section 11. With reference to FIGS. 12 and 16, it can be seen that in this embodiment, the left edge of the second stack section 11 is the edge of the second stack section 11 adjacent to the bent portion 25 of the second electrode plate 1. It can be seen that in this embodiment, the tab 15 of the second electrode plate 1 is located at the edge of the second electrode plate 1 adjacent to the bent portion 25. Since the second electrode plate 1 in this embodiment is a negative electrode plate 14, the tab 15 of the second electrode plate 1 is a negative tab 13, and the tab 15 of the second electrode plate 1 is arranged on the left side, facilitating the electrical connection of the negative tab 13 to the negative terminal 20*a* located on the left side of the battery cell 20.

Still referring to FIGS. 11-19, in this embodiment, for the first electrode plate 2, which is configured as a positive electrode plate 24, only one of the two first stack sections 21 is provided with a tab 15, and tab 15 is located at the end of the first stack section 21 away from the bent portion 25 of the first electrode plate 2. In this case, since the two first stack sections 21 are connected via the bent portion 25, the electric energy can be smoothly transmitted outward even if the first electrode plates 2 are each provided with a tab 15. Moreover, with reference to FIGS. 11-13, it can be seen that in this embodiment, the bent portions 25 of all the first electrode plates 2 face to the left, and enclose the left edge of the second stack section 11 of the second electrode plate 1 that is provided with no tab 15. At the same time, the tabs 15 of all the first electrode plates 2 are located at the right ends of the first electrode plates 2, that is to say, the tab 15 of each first stack section 21 is located at the right edge of the corresponding first stack section 21. Since the first electrode plate 2 in this embodiment is a positive electrode plate 24, the tab 15 of the first electrode plate 2 is a positive tab 23, and the tab 15 of the first electrode plate 2 is arranged on the right side, facilitating the electrical connection of the positive tab 23 to the negative terminal 20*b* located on the right side.

In this embodiment, the second electrode plate 1 uses the method in which the tabs protrude at intervals on a single side, the first electrode plate 2 uses the method in which the tab protrudes from one stack section on a single side, and the tab protruding directions of the second electrode plate 1 and the first electrode plate 2 are in the opposite directions, with the tabs located on two opposite sides in the first direction Y and protruding to the left and right respectively; therefore, the positive and negative tabs do not interfere with each other, and can be easily electrically connected to the positive and negative terminals respectively on the left and right sides, meeting the design requirements of the battery cell with electrode terminals on the left and right sides. Of course, referring to FIG. 7, in this embodiment, it is also possible that the two first stack sections 21 of the first electrode plate 2 are each provided with a tab 15. Since in this embodiment, no tab of the second electrode plate 1 protrudes on the side where the tabs of the first electrode plate 2 protrude, even if tabs protrude from both the two first stack sections 21 of the first electrode plate 2, they will not interfere with the tabs of the second electrode plate 1. When the two first stack sections 21 of the first electrode plate 2 are each provided with a tab 15, the electrical conduction efficiency is higher and the electrical conduction reliability is stronger.

Figure 17:
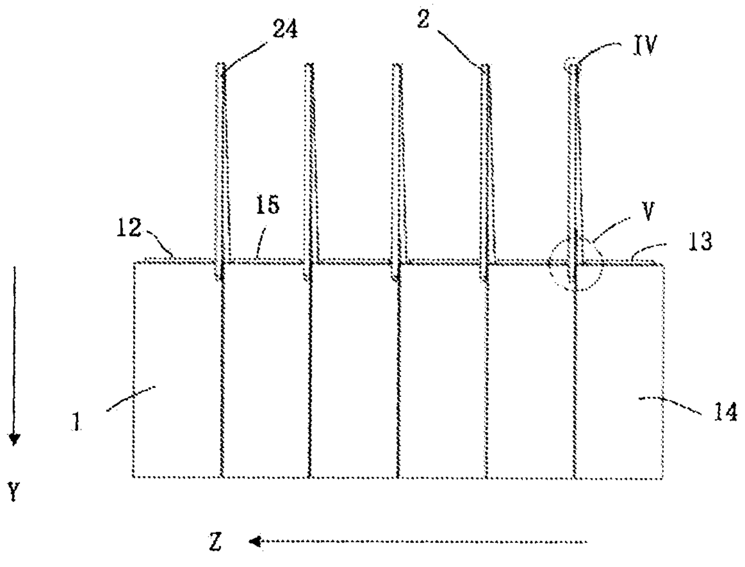
FIG. 17 is a side view of FIG. 16.

Moreover, with reference to FIGS. 12 and 17-18, it can be seen that in this embodiment, the bent portion 25 of the first electrode plate 2 and part of a straight section near each end of the bent portion 25 are configured as an inert zone 26. The surface of the inert zone 26 facing the second electrode plate 1 is coated with no active material 29, and is treated with an insulating material 27 such as a ceramic coating, a glue or a tape for providing an insulating function.

Since in this embodiment, the first electrode plate 2 is a positive electrode plate 24, the bent portion 25 of the first electrode plate 2 that wraps around the second electrode plate 1 and a region in the vicinity of the bent portion are constructed as the inert zone 26, so that the corresponding inert zone 26 does not produce lithium ions, and the part of the second stack section 11 extending into the corresponding inert zone 26 becomes the part of the negative electrode plate 14 extending beyond the positive electrode plate 24, that is, the part of the negative electrode plate extending beyond the positive electrode plate. In this way, the problem of lithium precipitation caused by the bent portion 25 of the first electrode plate 2 extending beyond the second electrode plate 1 can be fundamentally solved, effectively improving the operating safety. Moreover, simply by controlling the area of the inert zone 26, the area of the part of the corresponding negative electrode plate extending beyond the positive electrode plate can be effectively controlled. This is simple and convenient, and can skillfully solve the problem of the area of the part of the negative electrode plate extending beyond the positive electrode plate being difficult to control.

Further providing the insulating material 27 in the inert zone 26 can enhance the insulation between the positive and negative electrode plates, more reliably prevent a short circuit between the positive and negative electrode plates, and more effectively improve the safety performance.

As shown in FIGS. 16-17, in this embodiment, during assembling of the electrode assembly 201, it is only necessary to repeatedly fold the second electrode plate 1 in the second direction X and to half-fold a plurality of first electrode plates 2, and then to insert the plurality of first electrode plates 2 that have been half-folded together into the second stack sections 11, from each of which no tab 15 protrudes, of the second electrode plate 1 from the side of the second electrode plate 1 that is adjacent to the bent portion 25 and is provided with no tab 15, so that the orthogonal stacking process of the second electrode plate 1 and the first electrode plate 2 can be completed. Since the stacking process is simple and convenient, and the cutting process in the early stage is also relatively simple, the production efficiency of the electrode assembly 201, the battery cell 20, the battery 10 and the power consuming device 100 can be effectively improved, which is very important for the promotion and application of the stacked battery.

After each first electrode plate 2 is half-folded, the two first stack sections 21 thereof are not completely in close contact with each other, but are opened at a certain angle, to facilitate the insertion of the first electrode plate 2 into the second electrode plate 1.

In order to improve the safety performance, in this embodiment, although not shown, all the edges of the first stack section 21 that are provided with no tabs 15 are wrapped by the first separator 32 and the second separator 33 in a double-layered manner. For details, reference is made to the relevant description in the first embodiment for understanding, and the details are not repeated here.

Next, a third embodiment shown in FIGS. 20-28 will be described. In order to simplify the description, the difference between the third embodiment and the second embodiment will be mainly described in the following, and other parts not described can be understood with reference to the second embodiment.

As shown in FIGS. 20-28, in this third embodiment, the battery cell 20 is still a square stacked battery, and its electrode assembly 201 still uses an orthogonal “Z+U” stacking method, but it no longer uses the method in which tabs and electrode terminals protrude on the left and right sides. Instead, the battery cell use a method in which tabs and electrode terminals protrude at the top.

Figure 20:
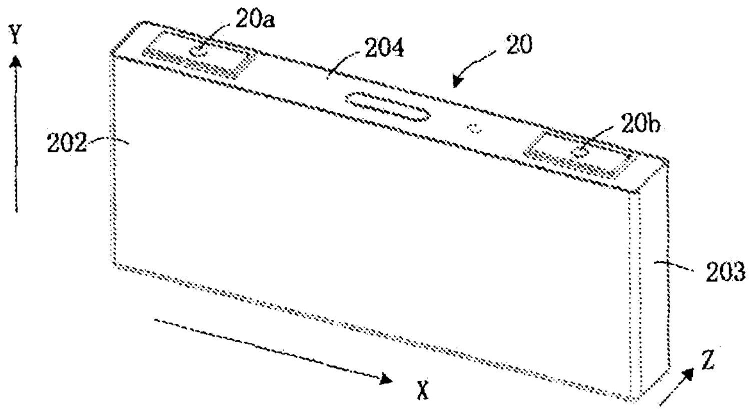
FIG. 20 is a schematic perspective view of a battery cell in a third embodiment of the present application.
Figure 21:
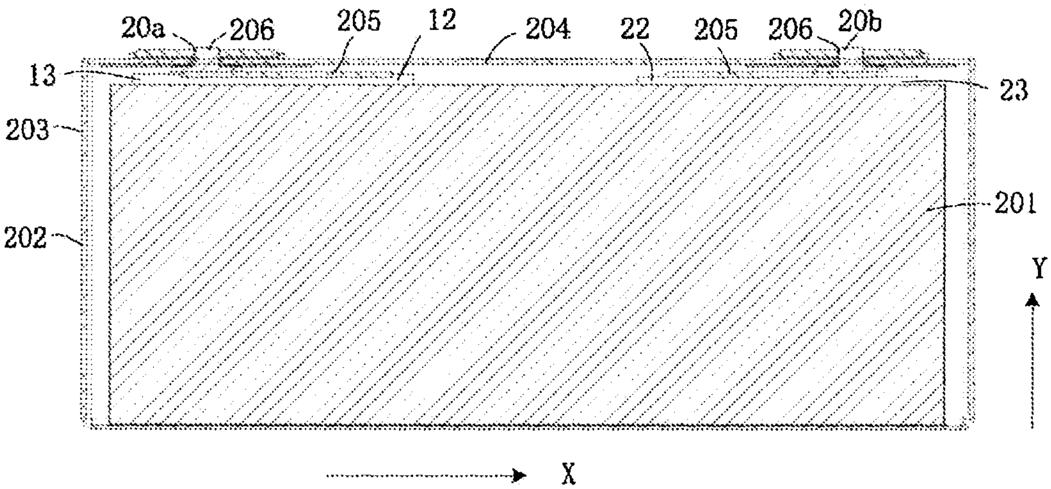
FIG. 21 is a schematic longitudinal sectional view of the battery cell in the third embodiment of the present application.

Specifically, it can be seen from FIGS. 20-21 that in this embodiment, the shell 202 is provided with only one detachably connected end cap 204, and the end cap 204 is detachably connected to the top end of the shell body 203. The two electrode terminals 206, namely the negative terminal 20*a* and the positive terminal 20*b* are both arranged on the top end cap 204, and protrude upward from the top end cap 204 to the outside of the shell 202. Specifically, the negative terminal 20*a* is located at the left part of the top end cap 204, and the positive terminal 20*b* is located at the right part of the top end cap 204.

Moreover, as shown in FIGS. 22-26, in this embodiment, the folding direction (i.e., the second direction X) of the second electrode plate 1 using the Z folding method is in the left-right direction, and the folding direction (i.e., the first direction Y) of the first electrode plate 2 using the U half-folding method faces upward, so that the second direction X and the first direction Y are orthogonal to each other, resulting in an orthogonal "Z+U" stacking method. A plurality of second stack sections 11 formed by folding the second electrode plate 1 and a plurality of first stack sections 21 formed by half-folding all the first electrode plates 2 are stacked alternately in sequence in the third direction Z. The third direction Z is in the thickness direction of each stack section and, in this embodiment, is perpendicular to the second direction X and the first direction Y.

It can be seen from FIGS. 22-26 that in this embodiment, the second electrode plate 1, which is configured as the negative electrode plate 14, no longer uses the method in which the tabs protrude at intervals on a single side, but uses a method in which the tabs protrude successively on a single side. Specifically, among the second stack sections 11 of the second electrode plate 1, each second stack section 11 is provided with a tab 15, and all the tabs 15 of the second electrode plate 1 are each located at the top edge of the corresponding second stack section 11. Since the second electrode plate 1 in this embodiment is a negative electrode plate 14, the tab 15 of the second electrode plate 1 is a negative tab 13, and the tab of the second electrode plate 1 is arranged at the top edge of the second electrode plate 1, facilitating the electrical connection of the negative tab 13 to the negative terminal 20*a* located at the top of the battery cell 20. As shown in FIG. 17, it can be seen that in this embodiment, the top edge of the second stack section 11 is the edge of the second stack section 11 adjacent to the bent portion 25 of the second electrode plate 1. It can be seen that in this embodiment, the tab 15 of the second electrode plate 1 is located at the edge of the second electrode plate 1 adjacent to the bent portion 25.

Still referring to FIG. 22-26, in this embodiment, the first electrode plate 2, which is configured as the positive electrode plate 24, no longer uses the method in which the tab protrudes from one stack section on a single side, but uses a method in which the tabs protrude from two stack sections on a single side. That is to say, the two first stack sections 21 of the first electrode plate 2 are both provided with tabs 15, and the tabs 15 are each located at the end of the bent portion 25 of the first stack section 21 away from the first electrode plate 2. Since in this embodiment, the folding direction of the first electrode plate 2 faces upward, the bent portion 25 of the first electrode plate 2 faces downward, and the end of the bent portion of the first electrode plate 2 away from the first electrode plate 2 is the top edge of the first stack section 21, so that the tabs 15 of the first electrode plate 2 in this embodiment are all located at the top edge of the first electrode plate 2. Since the first electrode plate 2 in this embodiment is a positive electrode plate 24, the tab 15 of the first electrode plate 2 is a positive tab 23, and the tab 15 of the first electrode plate 2 is arranged at the top edge of the first electrode plate 2, facilitating the electrical connection of the positive tab 23 to the negative terminal 20*b* located at the top of the battery cell 20.

Since in this embodiment, the tabs 15 of the second electrode plate 1 and the first electrode plate 2 are both located at the top, the tab 15 of the second electrode plate 1 and the tab 15 of the first electrode plate 2 are located on the same side in the first direction Y. In this case, in order to prevent the positive and negative tabs from interfering with each other, as shown in FIG. 17, in this embodiment, the tab 15 of the second electrode plate 1 and the tab of the first electrode plate 2 are arranged staggered in the folding direction (i.e., the second direction X) of the second electrode plate 1. Specifically, as shown in FIG. 17, in this embodiment, among any two adjacent bent portions 25 of the second electrode plate 1, the tab is only provided on the edge near one bent portion 25, and no tab 15 is provided on the edge near the other bent portion 25. All the tabs 15 of the second electrode plate 1 are arranged close to the bent portion 25 of the second electrode plate 1, while all the tabs 15 of the first electrode plate 2 are arranged away from the bent portion 25 of the second electrode plate 1. In this way, the tabs 15 of the second electrode plate 1 and the tabs 15 of the first electrode plate 2 are completely staggered in the second direction X and do not overlap each other. Therefore, when the positive and negative tabs are arranged on the same side, the mutual interference between the positive and negative tabs can be effectively prevented.

Figure 22:
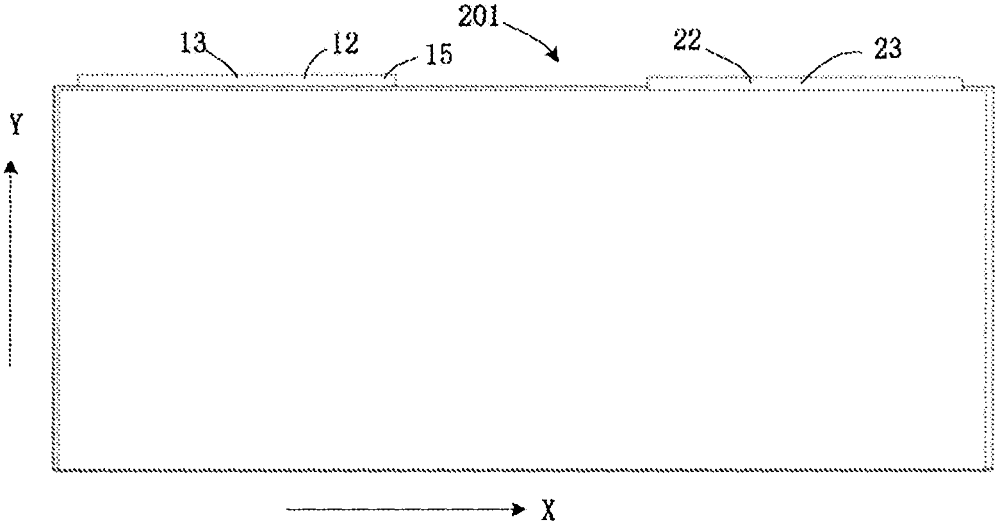
FIG. 22 is a front view of an electrode assembly in the third embodiment of the present application.
Figure 23:
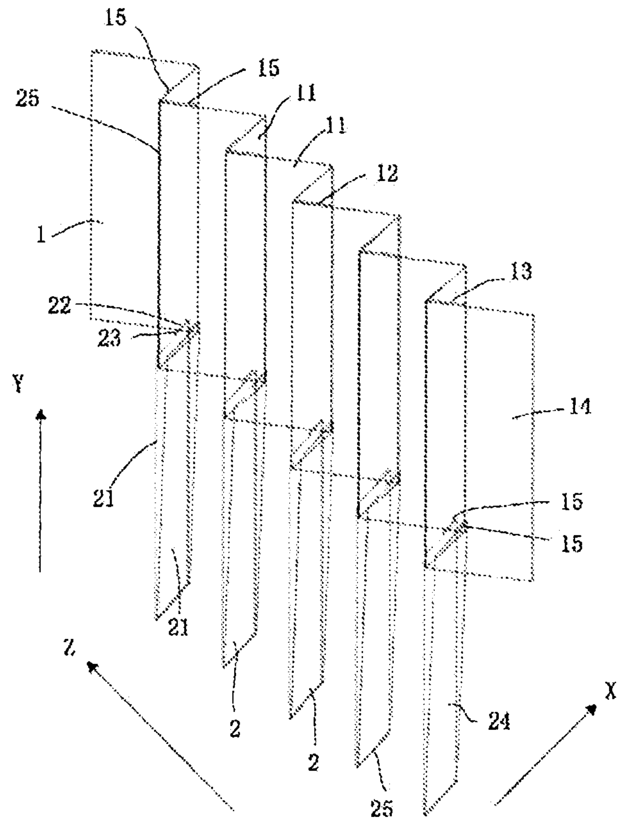
FIG. 23 is a schematic diagram of a stacking process of a second electrode plate and a first electrode plate in the third embodiment of the present application.
Figure 24:
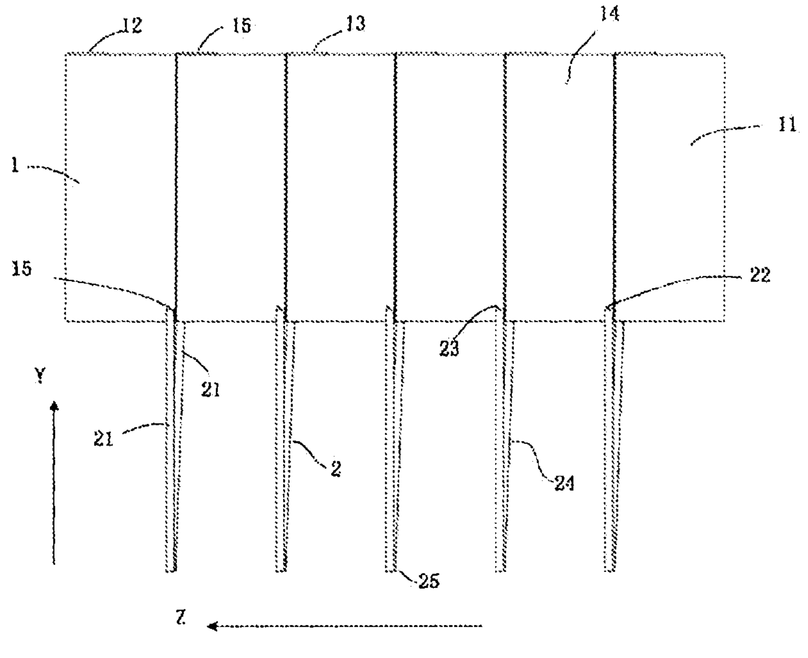
FIG. 24 is a side view of FIG. 23.
Figure 25:
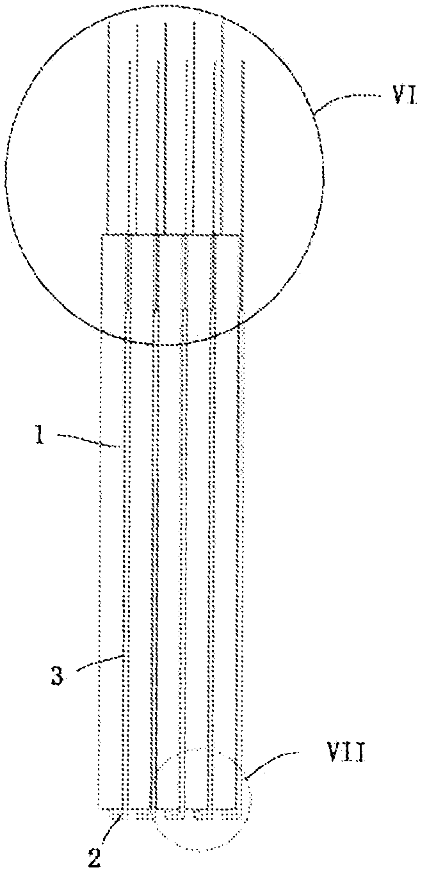
FIG. 25 is a side view of the electrode assembly in the third embodiment of the present application.
Figure 26:
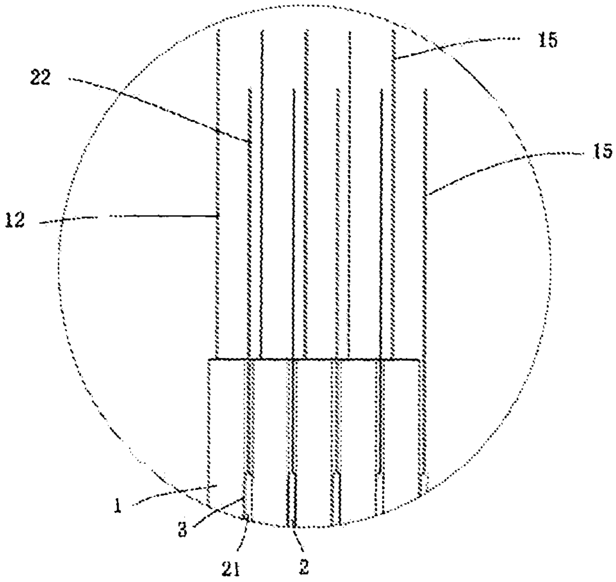
FIG. 26 is a schematic enlarged view of part VI of FIG. 25.
Figure 27:
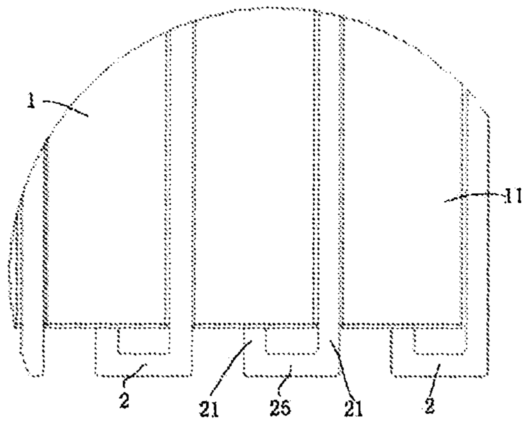
FIG. 27 is a schematic enlarged view of part VII of FIG. 25.

Since the positive and negative tabs are arranged staggered in the second direction X and the second direction X is in the left-right direction, as shown in FIGS. 21-22, it is possible that the positive and negative tabs are staggered in the left-right direction, all the negative tabs 13 are located on the left side of the top, and all the positive tabs 23 are located on the right side of the top, facilitating the electrical connection of the positive and negative tabs to the negative terminal 20*a* on the left side of the top and the positive terminal 20*b* on the right side of the top respectively, and meeting the design requirements of the battery cell with the electrode terminals protruding from the top.

As mentioned above, in this embodiment, all the bent portions 25 of the first electrode plates 2 face downward. In this case, in order to improve the heat dissipation performance of the electrode assembly 201 and the battery cell 20, referring to FIG. 28, in this embodiment, all the bent portions 25 of the first electrode plates 2 are in contact with an inner surface of a bottom wall of the shell 202. Since the first electrode plate 2 in this embodiment is arranged vertically, the orientation of the bent portion 25 of the first electrode plate 2 is the same as the direction of gravity. To be precise, the surface of the bent portion 25 of the first electrode plate 2 away from the second electrode plate 1 faces the direction of gravity. Therefore, after the electrode assembly 201 is mounted into the shell 202, the first electrode plate 2 can sink naturally under the action of gravity, so as to realize the natural contact between the bent portion 25 of the first electrode plate 2 and the inner surface of the bottom wall of the shell 202. After being in contact with the bottom wall of the shell 202, the bent portion 25 of the first electrode plate 2 may be deformed under pressure, such that the surface of the bent portion 25 facing away from the second electrode plate 1 changes from an arc shape to a roughly rectangular shape, thereby facilitating the bent portion 25 of the first electrode plate 2 to be more fully in contact with the bottom wall of the shell 202.

Since the bent portion 25 of the first electrode plate 2 and the shell 202 are both made of a metal material, the thermal conductivity is good, and the contact area between the bent portions 25 of all the first electrode plates 2 of the electrode assembly 201 and the bottom wall of the shell 202 is relatively large, which may roughly account for half of the area of the inner surface of the bottom wall of the shell 202. Therefore, in this embodiment, heat can be efficiently and fully conducted between the electrode assembly 201 and the shell 202 in contact, so that the heat generated by the electrode assembly 201 is quickly dissipated to the outside of the shell 202, improving the operating safety.

In this third embodiment, the first electrode plate 2 is also provided with an inert zone 26 comprising a bent portion 25, and the inert zone 26 is also provided with an insulating material 27, in order to improve the safety by further insulating and prevention of lithium precipitation, and by effectively controlling the area of the part of the negative electrode plate extending beyond the positive electrode plate. For details, reference is made to the relevant description in the second embodiment for understanding, and the details are not repeated here.

In addition, in this third embodiment, all the edges of the first electrode plate 2 that are provided with no tabs 15 are wrapped by the separators 3 in a double-layered manner, to prevent short-circuit accidents caused by the foreign matter and improve the safety performance. For details, reference is made to the relevant description in the first embodiment for understanding, and the details are not repeated here.

Next, a fourth embodiment shown in FIGS. 29-30 will be described.

As shown in FIGS. 29-30, in this fourth embodiment, the electrode assembly 201 no longer uses the orthogonal “Z+U” stacking method, but uses a parallel “Z+U” stacking method, that is, the folding direction (second direction X) of the second electrode plate 1 performing Z folding is parallel to the folding direction (first direction Y) of the first electrode plate 2 performing U half-folding. After the stack sections are made, the stacking direction (i.e., the third direction Z) of the stack sections is perpendicular to the second direction X, the first direction Y and the longitudinal direction of the second electrode plate 1. Here, the longitudinal direction of the second electrode plate 1 is perpendicular to the first direction Y (second direction X) and the third direction Z.

Moreover, as shown in FIGS. 29-30, in this embodiment, the second electrode plate 1 and the first electrode plate 2 are a negative electrode plate 14 and a positive electrode plate 24 respectively, and the bent portion 25 of the first electrode plate 2 encloses the bent portion 25 of the second electrode plate 1. At the same time, any two adjacent first electrode plates 2 are located on the two opposite sides of the second electrode plate 1 in the second direction X, to wrap around the different bent portions 25 of the second electrode plate 1. Two first electrode plates 2 constitute a pair, wrapping two successive bent portions 25 of the second electrode plate 1, and one bent portion 25 of the second electrode plate 1 is spaced between two adjacent pairs of first electrode plates 2. That is to say, after two successive bent portions of the second electrode plate 1 are enclosed, one bent portion 25 is not enclosed, then two further successive bent portions 25 are enclosed, and then another bent portion 25 is not enclosed, and so on. It can be understood that in FIG. 24, only a pair of first electrode plates 2 are shown in an exploded view, and the other pairs of first electrode plates 2 are show in the state where they enclose the second electrode plate 1.

Moreover, as shown in FIGS. 29-20, in this embodiment, the tabs 15 of the second electrode plate 1 and the first electrode plate 2 are both located at the edge adjacent to the bent portion 25, and the tabs are protruding in the same direction and are both located on the same side of the second electrode plate 1 in the longitudinal direction (or referred to as the length direction), so as to meet the design requirements of the battery cell with the tabs and the electrode terminals protruding on the same side. The two first stack sections 21 of the first electrode plate 2 are each provided with a tab 15; and each second stack section 11 of the second electrode plate 1 is also provided with a tab 15. In this way, all the tabs 15 of the second electrode plate 1 and all the tabs 15 of the first electrode plate 2 are arranged staggered in the second direction X, to prevent the positive and negative tabs from interfering with each other. Specifically, in this embodiment, all the tabs 15 of the first electrode plate 2 are located at the end, away from the bent portion 25, of the edge adjacent to the bent portion 25, and all the tabs of the second electrode plate 1 are located at the end, close to the bent portion 25, of the edge connected to the bent portion 25. Since in this embodiment, the bent portion 25 of the first electrode plate 2 encloses the bent portion of the second electrode plate 1, after such an arrangement, all the tabs 15 of the second electrode plate 1 and all the tabs 15 of the first electrode plate 2 can be arranged staggered in the second direction X.

It can be seen that FIGS. 29-30 show a parallel “Z+U” stacking method by taking the example in which the tabs of the second electrode plate 1 and the first electrode plate 2 protrude on the same side. However, it should be understood that in the parallel “Z+U” stacking method, the tab protruding directions of the second electrode plate 1 and the first electrode plate 2 may also be opposite, and the tabs are located on two opposite sides of the second electrode plate 1 in the longitudinal direction.

In this fourth embodiment, all the edges of the first electrode plate 2 that are provided with no tabs 15 are wrapped by the separators 3 in a double-layered manner, to prevent short-circuit accidents caused by the foreign matter and improve the safety performance. For details, reference is made to the relevant description in the first embodiment for understanding, and the details are not repeated here.

FIGS. 31-38 illustratively show the structure of the foldable first electrode plate 2 in the second to fourth embodiments described above.

For the foldable first electrode plate 2, its states before and after folding are referred to as an unfolded state and a folded state respectively. In the finished battery cell 20, the first electrode plate 2 is in the folded state, and the corresponding folded state has been shown in FIGS. 12-30. FIGS. 31-38 show the structure of the first electrode plate 2 in the unfolded state, that is, the structure of the first electrode plate 2 that is not folded.

Figure 31:
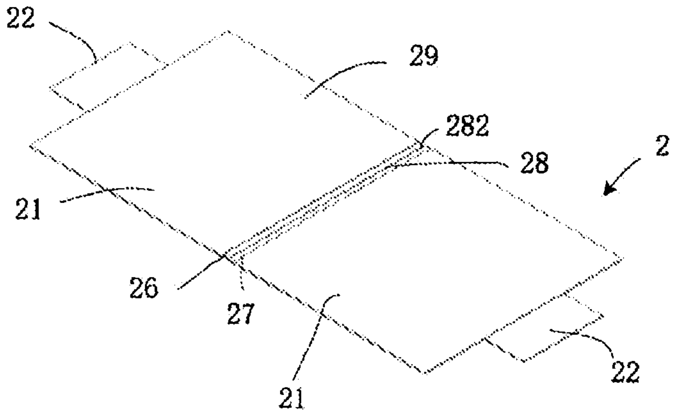
FIG. 31 is a schematic perspective view of a first electrode plate provided with a folding guide portion in an unfolded state in an embodiment of the present application.

FIG. 31 shows a first example of the first electrode plate 2. As shown in FIG. 31, in this example, the first electrode plate 2 is provided with an inert zone 26, and no active material 29 is provided on the surface of the inert zone 26. Therefore, the inert zone 26 is actually the part of the current collector that is not covered by the active material 29. The surface of the inert zone 26 is provided with an insulating material 27, which can improve the insulation between the positive and negative electrode plates.

Moreover, as shown in FIG. 31, in this example, the first electrode plate 2 is provided with a folding guide portion 28. The folding guide portion 28 is arranged in the inert zone 26 of the first electrode plate 2, and is specifically a crease 282.

The crease 282 is a linear crease, which extends from one edge of the first electrode plate 2 in the width direction to the other edge of the first electrode plate 2 in the width direction, and the extension direction is parallel to the width direction of the first electrode plate 2. On this basis, when necessary, the U half-folding of the first electrode plate 2 can be completed by simply half-folding the first electrode plate 2 along the crease 282, and the folding process is simpler and more convenient compared with the case where the first electrode plate 2 is provided with no folding guide portion 28. After folding, the edges of the two first stack sections 21 of the first electrode plate 2 are aligned in the width direction without deflection. Moreover, since the crease 282 is provided in the inert zone 26, after folding, the inert zone 26 comprises the bent portion 25 connected to the two first stack sections 21, facilitating the use of the inert zone 26 to control the area of the part of the negative electrode plate extending beyond the positive electrode plate, and thus improving the safety.

Figure 32:
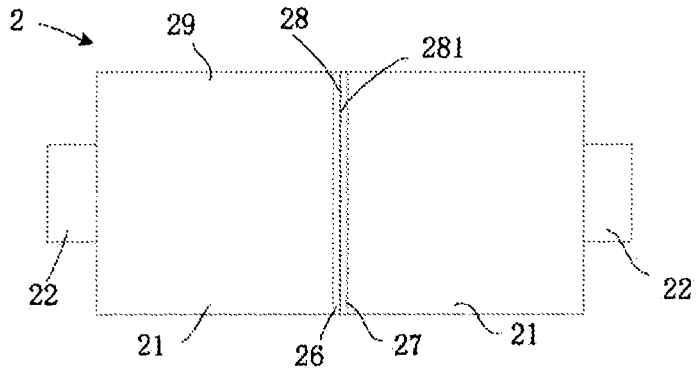
FIG. 32 is a variant of the first electrode plate shown in FIG. 31.
Figure 33:
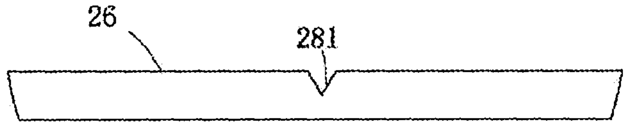
FIG. 33 is a partially enlarged schematic view of the first electrode plate shown in FIG. 32 at an indentation.

FIGS. 32-33 show a second example of the first electrode plate. As shown in FIG. 32, in this example, a folding guide portion 28 is still provided in the inert zone 26 of the first electrode plate 2, but unlike the first example shown in FIG. 31, the folding guide portion 28 is no longer the crease 282 but an indentation 281. In this example, the indentation 281 is a continuous linear indentation extending from one edge of the first electrode plate 2 in the width direction to the other edge of the first electrode plate 2 in the width direction, and the extension direction is parallel to the width direction of the first electrode plate 2. In this way, the U half-folding of the first electrode plate 2 can be completed by simply half-folding the first electrode plate 2 along the indentation 281, which is simple and convenient. Compared with the crease 282, the indentation 281 has a certain depth in the thickness direction of the first electrode plate 2, so it is more convenient to guide the folding, and the first electrode plate 2 can be guided to be half-folded along the indentation 281 more accurately, thereby being less likely to deviate. Moreover, the indentation 281 can be directly machined during the production process of the first electrode plate 2, and it is not necessary to obtain the indentation by pre-folding the first electrode plate 2 that has been machined. Therefore, the machining process of the indentation 281 is also convenient.

Figure 34:
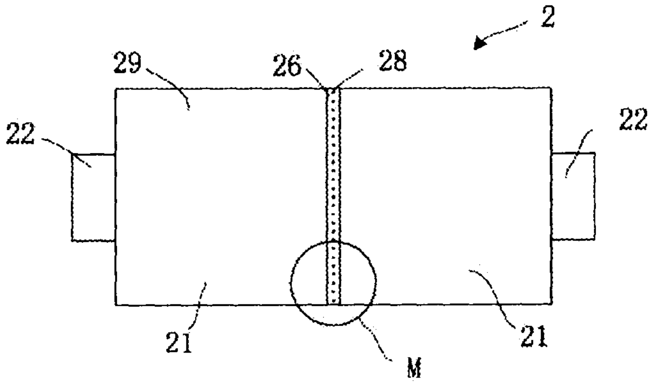
FIG. 34 is a variant of the first electrode plate shown in FIG. 31.
Figure 35:
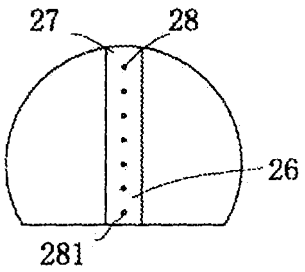
FIG. 35 is a schematic enlarged view of part M in FIG. 34.

FIGS. 34-35 show a third example of the first electrode plate. As shown in FIGS. 34-35, in this example, the folding guide portion 28 in the inert zone 26 of the first electrode plate 2 is still an indentation 281, and the indentation 281 still extends in the width direction of the first electrode plate 2, but in this example, the indentation 281 is no longer a continuous linear indentation, but an indentation in the form of a dotted line, which is composed of a plurality of small holes spaced side-by-side in the width direction of the first electrode plate 2. These small holes are either through holes or blind holes. On this basis, the half-folding of the first electrode plate 2 can also be conveniently completed.

Figure 36:
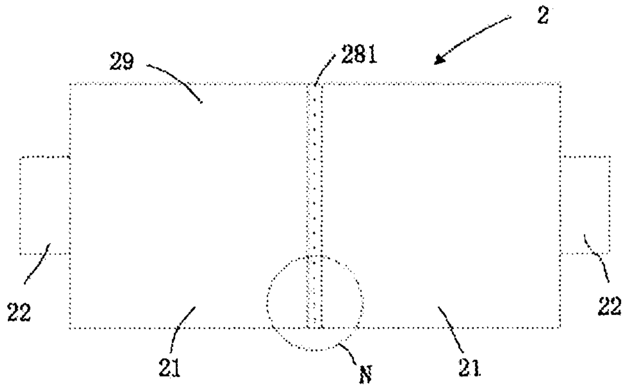
FIG. 36 is a variant of the first electrode plate shown in FIG. 31.
Figure 37:
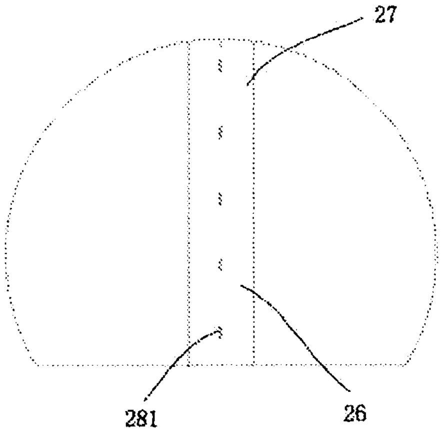
FIG. 37 is a schematic enlarged view of part N of FIG. 36.

FIGS. 36-37 show a fourth example of the first electrode plate. As shown in FIGS. 36-37, in this example, the inert zone 26 of the first electrode plate 2 is still provided with an indentation in the form of a broken line parallel to the width direction of the first electrode plate 2, but the difference from the third example shown in FIGS. 34-35 is that in this example, the indentation 281 in the form of a broken line is no longer the indentation in the form of a dotted line, but an indentation in the form of a dashed line. On this basis, the half-folding of the first electrode plate 2 can also be conveniently completed.

FIG. 38 shows a fifth example of the first electrode plate. As shown in FIG. 38, the main difference between this example and the previous examples shown in FIGS. 31-37 is that the folding guide portion 28 is no longer parallel to the width direction of the first electrode plate 2, but has an angle with the width direction of the first electrode plate 2. That is to say, in this example, the folding guide portion 28 is deflected relative to the width direction of the first electrode plate 2. In this way, after folding, the two first stack sections 21 of the first electrode plate 2 are no longer aligned in the width direction, but deflected. This not only facilitates the first electrode plate 2 to open at a certain angle after being folded so as to be inserted into the second electrode plate 1, but also facilitates the first stack sections 21 not to extend beyond the second stack sections 11 after the first electrode plates 2 are assembled to the second electrode plate 1, reducing the risk of lithium precipitation.

It should be noted that the folding guide portion 28 shown in FIG. 38 is in the form of a continuous straight line, but as an alternative, the deflected folding guide portion 28 may also use another structural form such as a dotted or dashed line. Moreover, the deflected folding guide portion 28 may be either a crease 282 or an indentation 281.

In view of FIGS. 31-38, it can be seen that in these examples, the two ends of the first electrode plate 2 are each provided with a tab 15. That is to say, the two first stack sections 21 of the first electrode plate 2 are each provided with a tab 15, and the first electrode plate 2 use the method in which the tabs protrude from two stack sections on a single side. However, it should be understood that this does not constitute a limitation to the present application. When the first electrode plate 2 is only provided with a tab 15 at one end and only one of the two first stack sections 21 is provided with a tab 15, the various folding guide portions 28 described above may also be provided on the first electrode plate 2.

Figure 39:
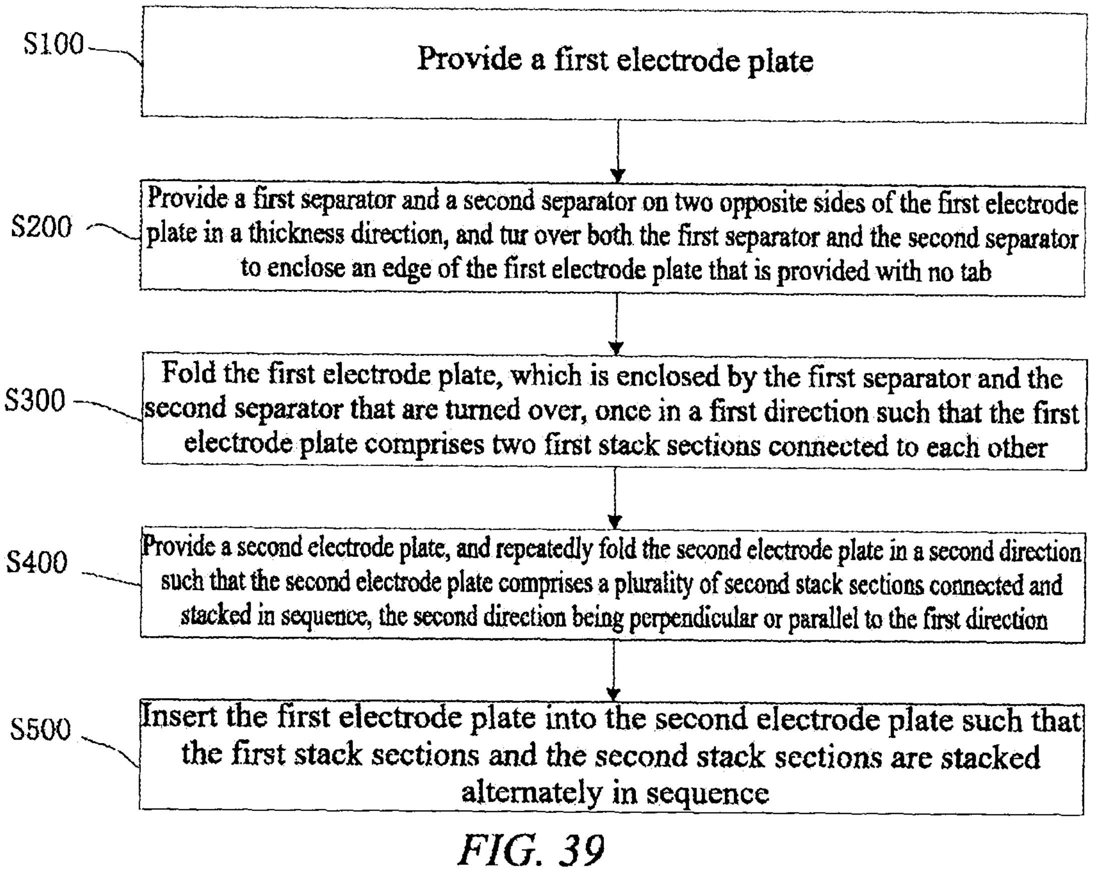
FIG. 39 shows a method of manufacturing an electrode assembly in an embodiment of the present application.

Referring to FIG. 39, based on the above embodiments, the present application also provides a method for manufacturing an electrode assembly, the method comprising:

a step S100 of providing a first electrode plate 2; and a step S200 of providing a first separator 32 and a second separator 33 on two opposite sides of the first electrode plate 2 in a thickness direction, and turning over both the first separator 32 and the second separator 33 to enclose an edge of the first electrode plate 2 that is provided with no tab 15.

The electrode assembly manufactured by using the above method has a reduced risk of short circuit and an improved safety performance.

In some embodiments, the manufacturing method further comprises:

a step S300 of folding the first electrode plate 2, which is enclosed by the first separator 32 and the second separator 33 that are turned over, once in a first direction Y such that the first electrode plate 2 comprises two first stack sections 21 connected to each other;

a step S400 of providing a second electrode plate 1, and repeatedly folding the second electrode plate 1 in a second direction X such that the second electrode plate 1 comprises a plurality of second stack sections 11 connected and stacked in sequence, the second direction X being perpendicular or parallel to the first direction Y; and a step S500 of inserting the first electrode plate 2 into the second electrode plate 1 such that the first stack sections 21 and the second stack sections 11 are stacked alternately in sequence.

The order of steps S400 and S300 is not limited, it is possible to perform step S300 first and then step S400, or to perform step S400 first and then step S300, or to perform step S300 and step S400 simultaneously.

Using the above method to manufacture the electrode assembly has a high efficiency and can effectively improve the production efficiency of the electrode assembly, the battery cell, the battery and the power consuming device.

Moreover, before the first electrode plate 2 is folded, two separators 3 are used to wrap around the edge of the first electrode plate 2 that is provided with no tab 15 in a double-layered manner, so that the safety performance of the electrode assembly can be effectively improved while facilitating the folding of the first electrode plate 2.

For the claimed subject described above of the present application and the features in the embodiments, reference may be made to each other, and those skilled in the art may also flexibly combine the technical features in different embodiments to form more embodiments as long as the structure is permitted.

Specific embodiments are used for illustrating principles and implementations of the present application herein. The above description of the embodiments is only used for helping understand the method and its core concept of the present application. It should be noted that several improvements and modifications may also be made to the present application by those of ordinary skill in the art without departing from the principles of the present application, and should also fall within the scope of protection of the present application.

The invention claimed is:

1. An electrode assembly comprising:

a first electrode plate;

a first separator;

a second separator, wherein the second separator and the first separator are located on two opposite sides of the first electrode plate in a thickness direction, and the first separator and the second separator are both turned over and enclose an edge of the first electrode plate that is provided with no tab; and a second electrode plate, the second electrode plate has an opposite polarity to the first electrode plate and is stacked together with the first electrode plate, and the first separator and the second separator separate the second electrode plate from the first electrode plate;

wherein the first electrode plate is folded once in a first direction (Y) such that the first electrode plate comprises two first stack sections connected to each other, and the second electrode plate is repeatedly folded in a second direction (X), the first direction (Y) being perpendicular or parallel to the second direction (X); such that the second electrode plate comprises a plurality of second stack sections connected and stacked in sequence; and a plurality of folded first electrode plates are inserted into the second electrode plate such that the first stack sections and the plurality of second stack sections are stacked alternately in sequence.

2. The electrode assembly according to claim 1, wherein the first separator and the second separator are compounded on the first electrode plate.

3. The electrode assembly according to claim 2, wherein the first separator and the second separator are hot-pressed on the first electrode plate, or the first separator and the second separator are bonded on the first electrode plate.

4. The electrode assembly according to claim 1, wherein the first electrode plate is a positive electrode plate.

5. The electrode assembly according to claim 1, wherein at least one of the two first stack sections of the first electrode plate is provided with a tab.

6. The electrode assembly according to claim 1, wherein the first electrode plate has an inert zone, the inert zone comprises a folded portion of the first electrode plate, and the inert zone is coated with no active material.

7. The electrode assembly according to claim 6, wherein an inner surface of the inert zone of the first electrode plate is provided with an insulating material.

8. The electrode assembly according to claim 1, wherein a tab of the first electrode plate is located at an edge of the first electrode plate except for a bent portion; and/or a tab of the second electrode plate is located at an edge of the second electrode plate except for the bent portion.

9. The electrode assembly according to claim 8, wherein the first direction (Y) is perpendicular to the second direction (X), the tab of the second electrode plate is located at the edge of the second electrode plate adjacent to the bent portion, and the tab of the first electrode plate is located at the end of the first electrode plate away from the bent portion; or the first direction (Y) is parallel to the second direction (X), the tab of the second electrode plate is located at the edge of the second electrode plate adjacent to the bent portion, and the tab of the first electrode plate is located at the edge of the first electrode plate adjacent to the bent portion.

10. The electrode assembly according to claim 9, wherein the first direction (Y) is perpendicular to the second direction (X); and among any two adjacent second stack sections, only one second stack section is provided with a tab, and the bent portion of the first electrode plate encloses the second stack section that is provided with no tab.

11. The electrode assembly according to claim 1, wherein a tab of the second electrode plate and a tab of the first electrode plate are located on a same side or on two opposite sides.

12. The electrode assembly according to claim 1, wherein the first electrode plate and/or the second electrode plate are/is provided with a folding guide portion, for guiding the folding of the first electrode plate.

13. The electrode assembly according to claim 12, wherein the folding guide portion comprises a crease or an indentation.

14. The electrode assembly according to claim 12, wherein the folding guide portion is parallel to a width direction of the first electrode plate and/or the second electrode plate, or the folding guide portion is inclined relative to the width direction of the first electrode plate and/or the second electrode plate.

15. A battery cell, comprising a shell further comprising an electrode assembly of claim 1, wherein the electrode assembly is arranged inside the shell.

16. The battery cell according to claim 15, wherein a tab of the first electrode plate is located at the end of the first electrode plate away from a bent portion, and the bent portion of the first electrode plate is in contact with an inner wall of the shell.

17. The battery cell according to claim 16, wherein the surface of the bent portion of the first electrode plate facing away from the second electrode plate faces the direction of gravity.

18. A battery comprising a packaging box further comprising a battery cell of claim 15, wherein the battery cell is arranged in the packaging box.

19. A power consuming device, comprising a body, further comprising a battery cell of claim 15, wherein the battery cell supplies electric energy for the body.

20. A method for manufacturing an electrode assembly comprising the steps of:

providing a first electrode plate; and providing a first separator and a second separator on two opposite sides of the first electrode plate in a thickness direction, and turning over both the first separator and the second separator to enclose an edge of the first electrode plate that is provided with no tab;

the method further comprising:

folding the first electrode plate, which is enclosed by the first separator and the second separator that are turned over, once in a first direction (Y) such that the first electrode plate comprises two first stack sections connected to each other;

providing a second electrode plate, and repeatedly folding the second electrode plate in a second direction (X) such that the second electrode plate comprises a plurality of second stack sections connected and stacked in sequence, the second direction (X) being perpendicular or parallel to the first direction (Y); and inserting a plurality of first electrode plates into the second electrode plate such that the first stack sections and the plurality of second stack sections are stacked alternately in sequence.

* * * * *